(12) United States Patent
Yuki

(10) Patent No.: US 8,605,317 B2
(45) Date of Patent: Dec. 10, 2013

(54) INFORMATION DISTRIBUTING APPARATUS, INFORMATION PROCESSING APPARATUS, AND COMPUTER PROGRAM

(75) Inventor: Naoto Yuki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 13/148,240

(22) PCT Filed: Mar. 16, 2010

(86) PCT No.: PCT/JP2010/055295
§ 371 (c)(1),
(2), (4) Date: Aug. 5, 2001

(87) PCT Pub. No.: WO2010/110401
PCT Pub. Date: Sep. 30, 2010

(65) Prior Publication Data
US 2011/0286044 A1   Nov. 24, 2011

(30) Foreign Application Priority Data
Mar. 23, 2009   (JP) .................... 2009-070884

(51) Int. Cl.
G06F 9/445    (2006.01)
G06F 15/16    (2006.01)

(52) U.S. Cl.
USPC .......... 358/1.15; 358/1.13; 358/1.1; 709/201; 709/202; 709/203; 709/217; 709/218; 709/219; 717/168; 717/171; 717/172; 717/174; 717/176; 717/177

(58) Field of Classification Search
USPC ......... 358/1.1, 1.11–1.18; 717/168–178, 134, 717/138; 709/201–203, 217–219
See application file for complete search history.

(56) References Cited

U.S. PATENT DOCUMENTS

| | | | | |
|---|---|---|---|---|
| 5,678,135 A | * | 10/1997 | Fukui et al. | 399/77 |
| 6,801,328 B2 | * | 10/2004 | Tsukamoto et al. | 358/1.13 |
| 7,065,770 B2 | | 6/2006 | Nomura et al. | |
| 7,227,656 B1 | * | 6/2007 | Kato | 358/1.15 |
| 7,693,961 B2 | | 4/2010 | Nomura et al. | |
| 8,239,857 B2 | * | 8/2012 | Osada | 717/177 |
| 2001/0027517 A1 | * | 10/2001 | Kato | 713/1 |
| 2002/0002604 A1 | | 1/2002 | Nomura et al. | |
| 2003/0231895 A1 | | 12/2003 | Seto et al. | |
| 2007/0043971 A1 | * | 2/2007 | Suzuki | 714/11 |
| 2007/0169119 A1 | | 7/2007 | Osada | |
| 2007/0288423 A1 | * | 12/2007 | Kimoto | 707/1 |
| 2008/0055625 A1 | * | 3/2008 | Akiyoshi et al. | 358/1.13 |
| 2010/0235846 A1 | | 9/2010 | Yamamichi et al. | |
| 2010/0251232 A1 | * | 9/2010 | Shinomiya | 717/177 |

FOREIGN PATENT DOCUMENTS

| | | |
|---|---|---|
| JP | 2002-014784 A | 1/2002 |
| JP | 2004-021576 A | 1/2004 |
| JP | 2007-183922 A | 7/2007 |
| JP | 2007-272763 A | 10/2007 |
| JP | 2008015794 A | 1/2008 |

OTHER PUBLICATIONS

Oct. 6, 2011 International Preliminary Report on Patentability in International Patent Appln. No. PCT/JP2010/055295.

* cited by examiner

*Primary Examiner* — Chad Dickerson
(74) *Attorney, Agent, or Firm* — Fitzpatrick, Cella, Harper & Scinto

(57) ABSTRACT

An information distributing apparatus obtains a serial number input from the image forming apparatus and information regarding an apparatus connected to the image forming apparatus. The information distributing apparatus determines permission or inhibition of distribution with respect to each program specified by the serial number.

8 Claims, 20 Drawing Sheets

| HARDWARE ID | NAME |
|---|---|
| H001 | SCANNER |
| H004 | PRINTER |
| H010 | FINISHER |
| H127 | EXTERNAL CONTROLLER |

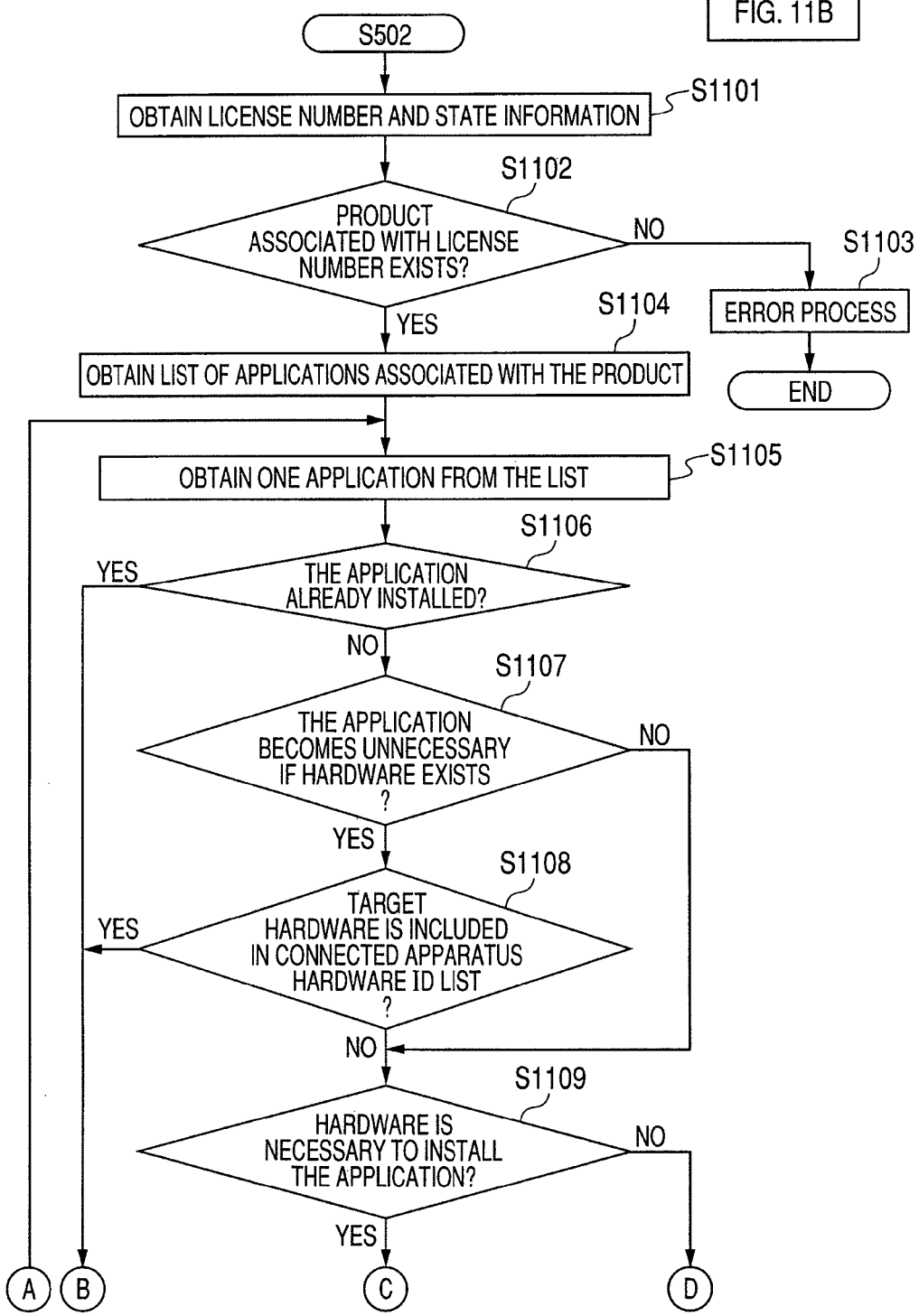

FIG. 12

Table 1201:

| PRODUCT ID (1202) | PRODUCT NAME (1203) | LICENSE NUMBER (1204) | CONSTRUCTION APPLICATION ID (1205) |
|---|---|---|---|
| S00001 | PRODUCT A | LN727 | A0001, A0002, A0003, A0007, A0008, A0011, A0014 |
| S00002 | PRODUCT B | LN811 | A0001, A0002, A0003, A0004, A0005, A0006 |
| S00003 | PRODUCT C | LN221 | A0001, A0002, A0003 |
|  |  |  |  |

FIG. 13

Table 1301:

| APPLICATION ID (1302) | APPLICATION NAME (1303) | DEPENDENT APPLICATION ID (1304) | DEPENDENT HARDWARE ID (1305) | EXCLUSIVE HARDWARE ID (1306) |
|---|---|---|---|---|
| A0001 | SEND | — | H001 |  |
| A0002 | ENCRYPTED PDF | A0001 |  |  |
| A0003 | SEARCHABLE PDF | A0001 |  |  |
| A0004 | HIGHLY COMPRESSED PDF |  |  |  |
| A0005 | SIGNED PDF |  |  |  |
| A0006 | SCALABLE PDF | A0004 |  |  |
| A0007 | PAGE DESCRIPTION LANGUAGE 1 |  |  | H127 |
| A0008 | PAGE DESCRIPTION LANGUAGE 2 | A0007 |  | H127 |
| A0009 | OUTLINE |  |  |  |
| A0010 | BROWSER |  |  |  |
| A0011 | PAGE DESCRIPTION LANGUAGE 3 | A0008 |  | H127 |
| A0012 | ENCRYPTED SECURE PRINT |  |  |  |
| A0013 | BACKGROUND PATTERN |  |  |  |
| A0014 | VNC |  |  |  |
|  |  |  |  |  |

| HARDWARE ID | APPARATUS NAME |
|---|---|
| H001 | SCANNER |
| H002 | OPERATION PANEL |
| H003 | OPERATION |
| H004 | PRINTER |
| H010 | FINISHER |
| H011 | PUNCHER UNIT |
| H012 | SADDLE FINISHER |
| H020 | SIDE PAPER DECK |
| H030 | HANDSET |
| H070 | CARD READER |
| H127 | EXTERNAL CONTROLLER |
| | |
| | |

SELECT APPLICATION TO BE INSTALLED AND PRESS INSTALL BUTTON.

PRODUCT NAME: PRODUCT A
- ☐ SEND: INSTALLED
- ☑ ENCRYPTED PDF
- ☑ SEARCHABLE PDF
- ☐ PAGE DESCRIPTION LANGUAGE 1: UNNECESSARY BECAUSE EXTERNAL CONTROLLER IS CONNECTED
- ☐ PAGE DESCRIPTION LANGUAGE 2: UNNECESSARY BECAUSE EXTERNAL CONTROLLER IS CONNECTED
- ☐ PAGE DESCRIPTION LANGUAGE 3: UNNECESSARY BECAUSE EXTERNAL CONTROLLER IS CONNECTED
- ☐ VNC: INSTALLED

[INSTALL]

FIG. 18

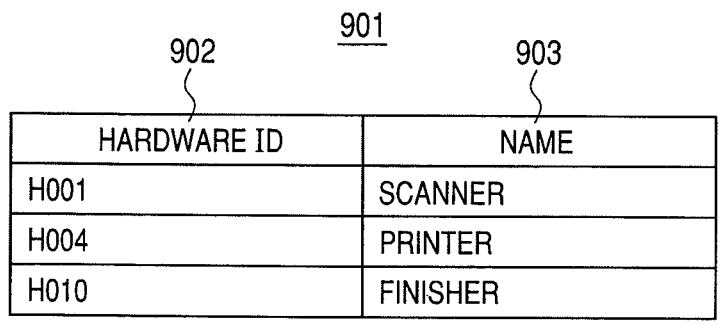

| HARDWARE ID | NAME |
|---|---|
| H001 | SCANNER |
| H004 | PRINTER |
| H010 | FINISHER |

1700b

SELECT APPLICATION TO BE INSTALLED AND PRESS INSTALL BUTTON.

PRODUCT NAME: PRODUCT A
- ☐ SEND: INSTALLED
- ☑ ENCRYPTED PDF
- ☑ SEARCHABLE PDF
- ☑ PAGE DESCRIPTION LANGUAGE 1
- ☑ PAGE DESCRIPTION LANGUAGE 2
- ☑ PAGE DESCRIPTION LANGUAGE 3
- ☐ VNC: INSTALLED

[INSTALL]

1700c

SELECT APPLICATION TO BE INSTALLED AND PRESS INSTALL BUTTON.

PRODUCT NAME: PRODUCT A
- ☐ SEND: INSTALLED
- ☑ ENCRYPTED PDF
- ☑ SEARCHABLE PDF
- ☐ PAGE DESCRIPTION LANGUAGE 1
- ☐ PAGE DESCRIPTION LANGUAGE 2:
  UNINSTALLABLE BECAUSE BDL IS NOT SELECTED
- ☐ PAGE DESCRIPTION LANGUAGE 3:
  UNINSTALLABLE BECAUSE PAGE DESCRIPTION
  LANGUAGE 2 IS NOT SELECTED
- ☐ VNC: INSTALLED

[ INSTALL ]

SELECT APPLICATION TO BE INSTALLED AND PRESS INSTALL BUTTON.

PRODUCT NAME: PRODUCT A
- ☐ SEND: INSTALLED
- ☑ ENCRYPTED PDF
- ☑ SEARCHABLE PDF
- ☑ PAGE DESCRIPTION LANGUAGE 1
- ☐ PAGE DESCRIPTION LANGUAGE 2
- ☐ PAGE DESCRIPTION LANGUAGE 3: UNINSTALLABLE BECAUSE PAGE DESCRIPTION LANGUAGE 2 IS NOT SELECTED
- ☐ VNC: INSTALLED

INSTALL

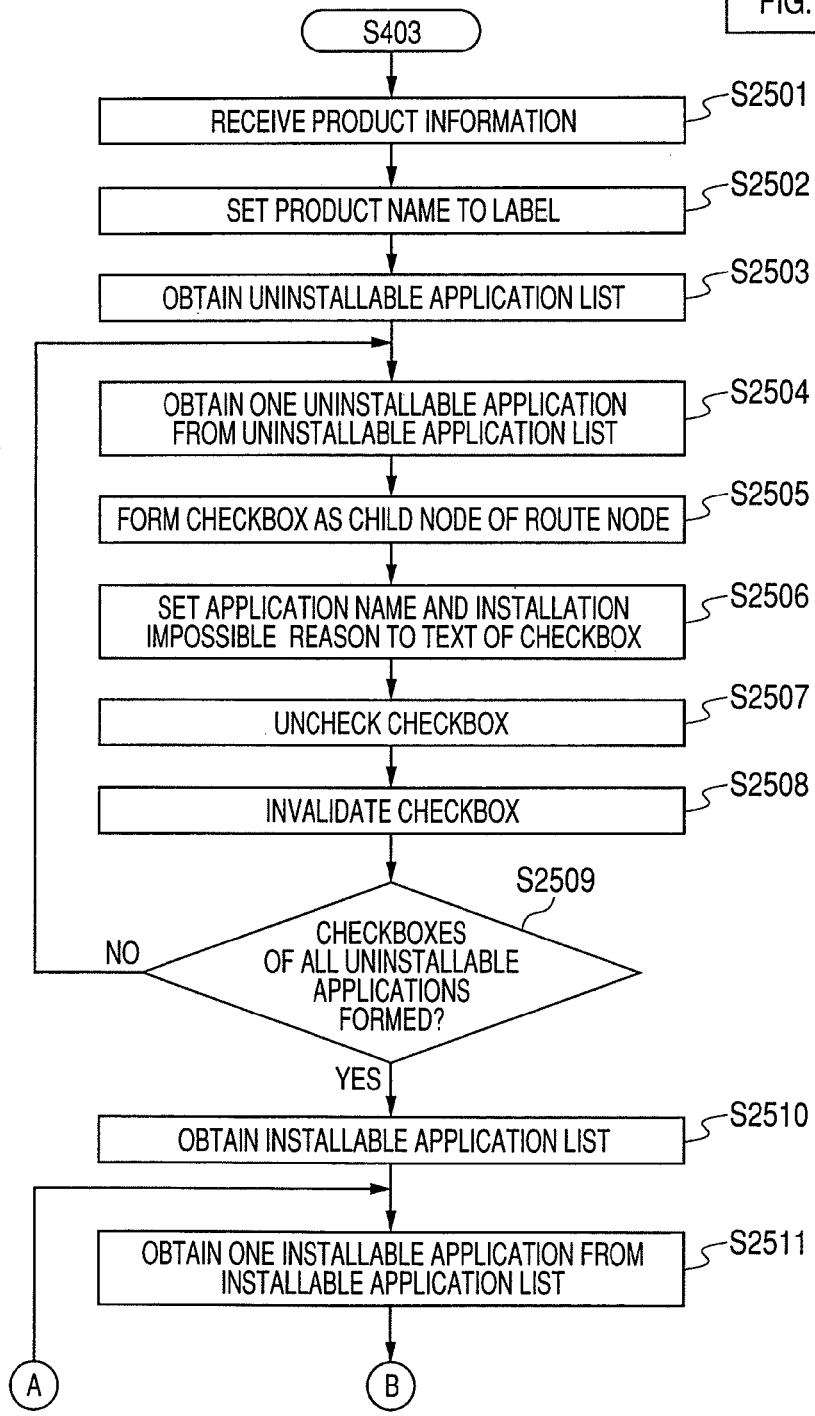

2600a

SELECT APPLICATION TO BE INSTALLED AND PRESS INSTALL BUTTON.

PRODUCT NAME: PRODUCT A
- ☐ SEND: INSTALLED
  - ☑ ENCRYPTED PDF
  - ☑ SEARCHABLE PDF
- ☑ PAGE DESCRIPTION LANGUAGE 1
  - ☑ PAGE DESCRIPTION LANGUAGE 2
    - ☑ PAGE DESCRIPTION LANGUAGE 3
- ☐ VNC: INSTALLED

[INSTALL]

2600b

SELECT APPLICATION TO BE INSTALLED AND PRESS INSTALL BUTTON.

PRODUCT NAME: PRODUCT A
- ☐ SEND: INSTALLED
  - ☑ ENCRYPTED PDF
  - ☑ SEARCHABLE PDF
  - ☐ PAGE DESCRIPTION LANGUAGE 1
    - ☐ PAGE DESCRIPTION LANGUAGE 2
      - ☐ PAGE DESCRIPTION LANGUAGE 3
- ☐ VNC: INSTALLED

[INSTALL]

INFORMATION DISTRIBUTING APPARATUS, INFORMATION PROCESSING APPARATUS, AND COMPUTER PROGRAM

TECHNICAL FIELD

The present invention relates to an information distributing apparatus, an information processing apparatus, and a computer program and, more particularly, the invention is suitable for use in installation of a program.

BACKGROUND ART

In recent years, in an image forming apparatus, various kinds of application programs (hereinbelow, abbreviated to applications) can be used and the end user who uses the image forming apparatus can use a function for providing those applications. As such applications, there are an application which has been installed as a standard in the image forming apparatus and can be used without cost, an onerous application which can be used for the first time by using a license file that is obtained by purchasing a product, and the like.

When installing the onerous application, the serviceman allows a plurality of license files to be issued from a license issuing apparatus by using a license number written on a license certificate of the product which the user purchased. The serviceman allows the image forming apparatus to execute an installation of an application based on the plurality of issued license files by using an installing function of the image forming apparatus.

The applications of the recent image forming apparatus are the complicated applications mutually having a dependent relation and there is such a problem that if the license file is simply input, the application cannot be installed or activated.

Therefore, according to Japanese Patent Application Laid-Open No. 2007-183922, in the case of installing a plurality of applications, the image forming apparatus discriminates a proper external apparatus to be installed based on attribute information of each application, transfers the application to the external apparatus, and allows the application to be installed therein. Further, according to Japanese Patent Application Laid-Open No. 2007-183922, the activation of the application is controlled in activating order designated based on the attribute information of the application.

According to the Official Gazette of Japanese Patent Application Laid-Open No. 2007-272763, when an additional module is added to modules constructing the applications which have already been installed, the additional module is installed so that each module operates in correct order. Specifically speaking, according to the Official Gazette of Japanese Patent Application Laid-Open No. 2007-272763, the additional module is installed so that each module operates in order based on a priority number included in a file constructing the additional module.

DISCLOSURE OF INVENTION

There is provided an information distributing apparatus which can communicate with an image forming apparatus, comprising: obtaining means for obtaining, from the image forming apparatus, information showing whether or not an external apparatus which can execute a predetermined program in place of the image forming apparatus has been connected to the image forming apparatus, and distributing means for distributing the predetermined program so as to install the predetermined program into the image forming apparatus, wherein if it is determined from the information obtained by the obtaining means that the external apparatus which can execute the predetermined program in place of the image forming apparatus has been connected to the image forming apparatus, the distributing means is controlled so as not to distribute the predetermined program.

Further features of the present invention will become apparent from the following description of exemplary embodiments with reference to the attached drawings.

BRIEF DESCRIPTION OF DRAWINGS

FIG. 12 is diagram illustrating an example of a product table.

FIG. 13 is diagram illustrating an example of an application table.

FIG. 17 is diagram illustrating a first example of the installation application selection display screen.

FIG. 18 is diagram illustrating an example of a list of hardware IDs of the apparatuses connected to the image forming apparatus.

FIG. 23 is diagram illustrating an example of an installation application selection display screen which is displayed in the case where, on the installation application selection display screen of FIG. 21, the user checked the checkbox of the page description language 1.

BEST MODE FOR CARRYING OUT THE INVENTION

In the related arts, all applications as targets of installation are installed and nothing is considered about applications which have already been installed or an application which will be meaningless even if it is installed. For example, if the image forming apparatus is not provided with a scanner apparatus, there is a case where even if an application which realizes a function such as SEND for reading an original document and transmitting data to a personal computer is installed in the image forming apparatus, the image forming apparatus cannot use such an application.

On the other hand, there is an external controller apparatus in which an image process (image process of PDL) which is executed by the image forming apparatus is executed by an external apparatus having higher processing performance, thereby realizing a high print speed. When the external controller apparatus is connected to the image forming apparatus, even if a PDL processing program as an application for executing the image process of PDL has been installed in the image forming apparatus, the image forming apparatus operates as if it was processed by the external controller apparatus. Therefore, there occurs a case where even if the application for executing the image process of PDL is installed in the image forming apparatus to which the external controller apparatus has been connected, since such an application is not used, it is meaningless to install it.

Even if the application is installed in the image forming apparatus in a state where it complies with such a case as mentioned above, such an application actually becomes wasteful and the user has to pay a surplus license fee.

Therefore, hitherto, in the case of installing the application, the serviceman examines an apparatus annexed to the target image forming apparatus or the external controller apparatus, thereby discriminating an unnecessary application. However, it takes time for the serviceman to execute such an operation at the actual place and there is a case where a wasteful license due to an artificial mistake is issued.

The invention is made in consideration of at least one of the above problems and such a situation that an unnecessary program is installed in an information distributing apparatus such as an image forming apparatus can be prevented as compared with that in the related art.

A first embodiment to which the invention can be applied will be described hereinbelow by using the drawings.

Figure 1:
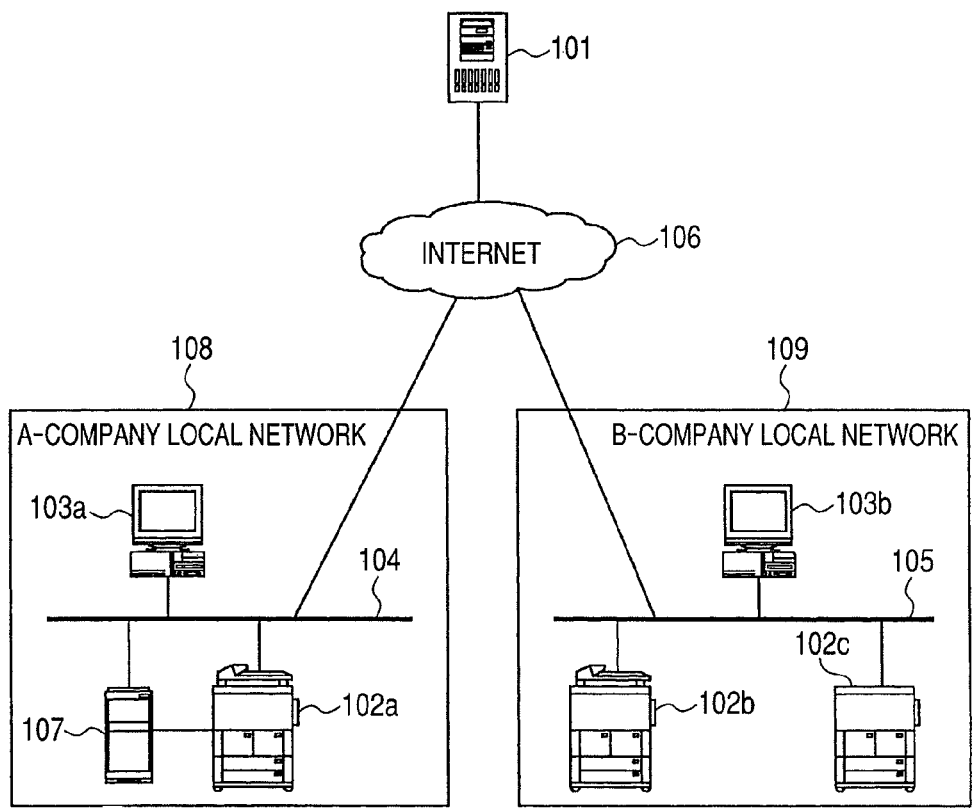
FIG. 1 is diagram illustrating an example of a system construction of an application installing system.

FIG. 1 is a diagram illustrating an example of a system construction of an application installing system.

In FIG. 1, an A-company local network 108 and a B-company local network 109 are intra-office networks of the A company and the B company, respectively. In the A-company local network 108, a client PC 103a and an image forming apparatus 102a are mutually connected through a LAN 104. The image forming apparatus 102a is mutually connected to an external controller 107 for executing an image forming process of PDL. In the B-company local network 109, a client PC 103b and image forming apparatuses 102b and 102c are mutually connected through a LAN 105.

In the example illustrated in FIG. 1, a case where one client PC and one or two image forming apparatuses exist in the local network is shown. However, the number of image forming apparatuses may be set to an arbitrary value.

Hereinbelow, when there is no need to distinguish the client PCs 103a and 103b, each of them is called a client PC 103 and when there is no need to distinguish the image forming apparatuses 102a and 102b, each of them is called an image forming apparatus 102.

A license issuing apparatus 101 for issuing a license in response to a request from the image forming apparatus 102 is connected to an Internet 106. The image forming apparatus 102 can access the license issuing apparatus 101 through the Internet 106.

Figure 2:
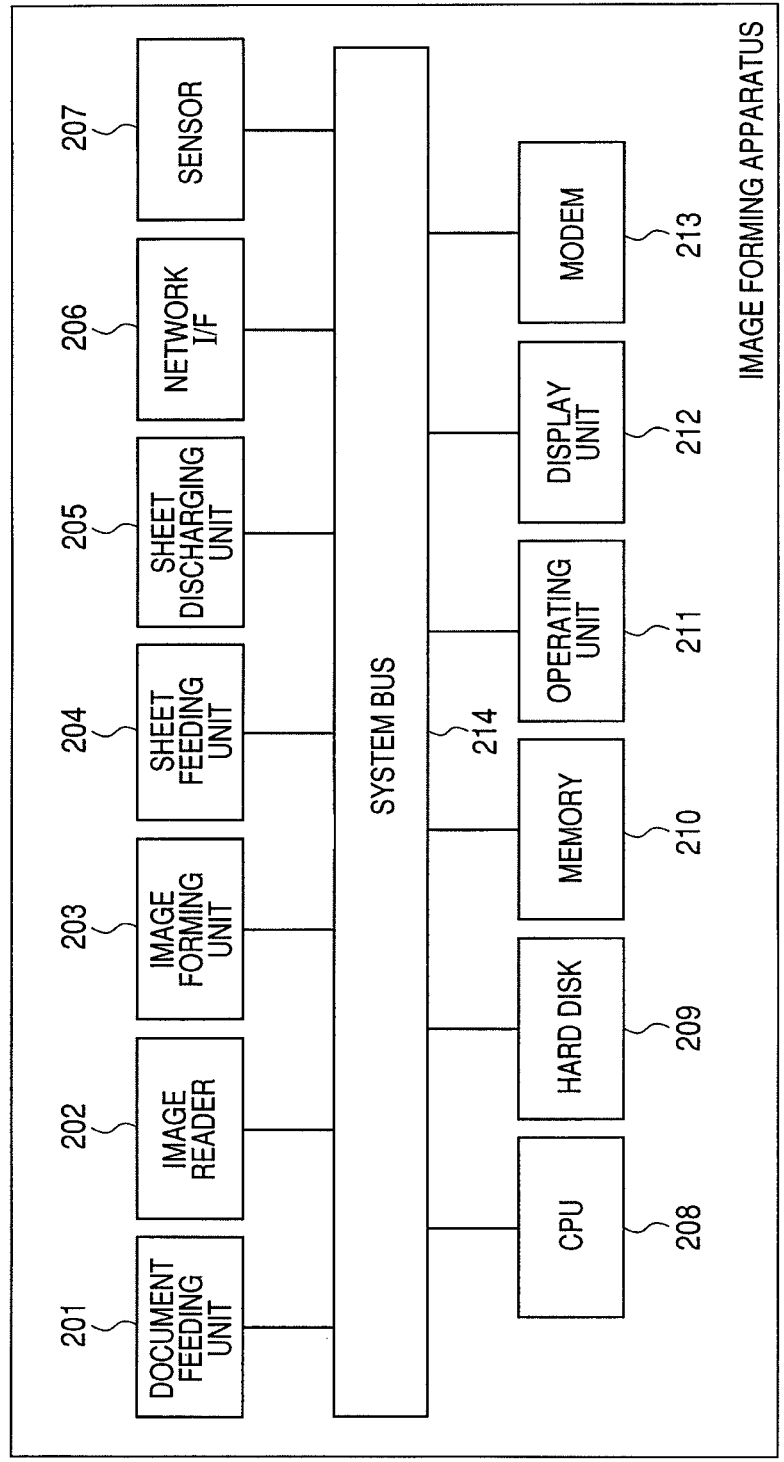
FIG. 2 is diagram illustrating an example of a hardware construction of an image forming apparatus.

FIG. 2 is a diagram illustrating an example of a hardware construction of each the image forming apparatuses 102a and 102b.

A document feeding unit 201 automatically conveys the original to be read to an image reader 202. The image reader 202 is a scanner and reads the original. An image forming unit 203 converts the read original or data received from the outside into a print image and prints it. A sheet feeding unit 204 feeds paper for printing. A sheet discharging unit 205 ejects the printed paper and executes a process such as sorting or stapling.

A network I/F 206 is connected to the LANs 104 and 105 and the Internet 106 and exchanges information to/from the outside. A sensor 207 detects a state of each portion of the image forming apparatus 102. A CPU 208 executes each process on the image forming apparatus 102. A hard disk 209 stores a program, data, and temporary data regarding each process of the image forming apparatus 102, user data transmitted to the image forming apparatus 102, and the like. A memory 210 stores the temporary data regarding each process of the image forming apparatus 102 so as to be electrically rewritable. An operating unit 211 receives an instruction input from the user to the image forming apparatus 102. A display unit 212 displays an operation situation of the image forming apparatus 102, information regarding the operation to the operating unit 211, and the like. A modem 213 is connected to a telephone line. A system bus 214 connects the portions 201 to 214 and transmits and receives data to/from them.

The image forming apparatus 102c illustrated in FIG. 1 does not have the scanner apparatus for reading the original. Therefore, the hardware construction of the image forming apparatus 102c is, for example, a construction obtained by excluding the document feeding unit 201 and the image reader 202 from the hardware construction of each the image forming apparatuses 102a and 102b illustrated in FIG. 2.

Figure 3:
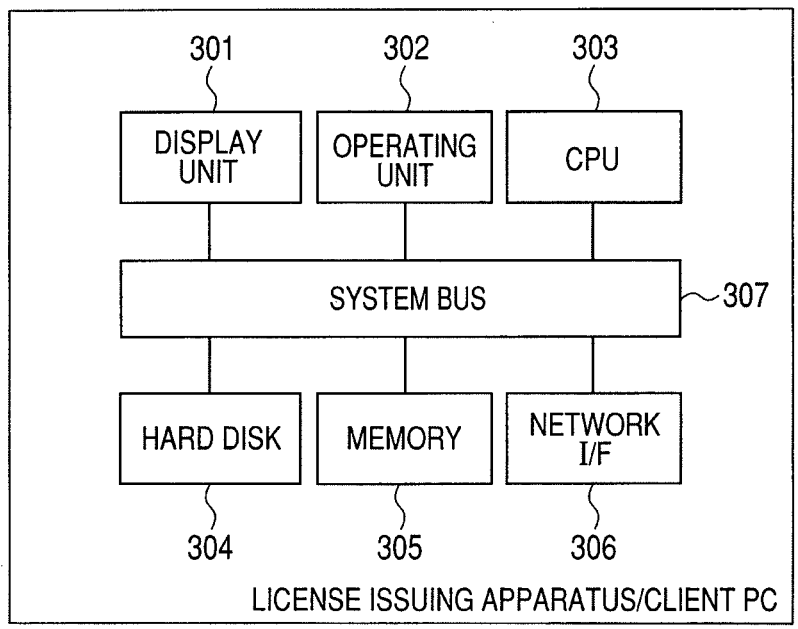
FIG. 3 is diagram illustrating an, example of a hardware construction of a license issuing apparatus and a client PC.

FIG. 3 is a diagram illustrating an example of a hardware construction of the license issuing apparatus 101 and the client PC 103.

A display unit 301 displays a window, an icon, a message, a menu, other user interface information, and the like. An operating unit 302 receives an input of the end user who uses a keyboard or a mouse. A CPU 303 executes each process on the present apparatus. A hard disk 304 stores the program, data, and temporary data regarding each process of the present apparatus, data transmitted to the present apparatus, and the like. A memory 305 stores the temporary data regarding each process of the present apparatus so as to be electrically rewritable. A network I/F 306 is connected to the Internet 106 and exchanges information to/from the outside. A system bus 307 connects the portions 301 to 206 and transmits and receives data to/from them.

Subsequently, an example of a process at the time when the image forming apparatus 102 receives a license of the application from the license issuing apparatus 101 and installs the application.

The CPU 208 of the image forming apparatus 102 executes the process according to the above flowchart in the case where an installation start instruction from the user was detected in the operating unit 211.

In step S401, the CPU 208 allows the display unit 212 to display a display screen for allowing the user to input a license number.

When it is detected that the user has input the license number by operating a license number input display screen displayed on the display unit 212, the CPU 208 obtains the input license number in step S402. At this time, the CPU 208 obtains state information of the image forming apparatus 102, transmits the obtained license number and state information from the network I/F 206 to the license issuing apparatus 101 through the Internet 106, and requests it to inquire about the product information. Details about the above process will be described by a flowchart of FIG. 7. In the embodiment, for example, by executing the process of step S402, an example of transmitting means and second transmitting means is realized.

As will be described with reference to a flowchart of FIG. 5, the license issuing apparatus 101 which received the product information inquiry request obtains information of installable applications based on the license number included in the product information inquiry request and transmits it to the image forming apparatus 102. The CPU 208 of the image forming apparatus 102 receives the application information through the network I/F 206. Thus, in step S403, the CPU 208 allows the display unit 212 to display an installation application selection display screen for allowing the user to select the application to be installed from the installable applications.

When it is detected that the user has selected the application to be installed by the installation application selection display screen, the CPU 208 obtains a list of selected applications in step S404. The network I/F 206 transmits the list of applications obtained by the CPU 208 to the license issuing apparatus 101 through the Internet 106 and requests it to issue the license. In the embodiment, for example, by executing the process of step S404, an example of third second transmitting means is realized.

As will be described with reference to a flowchart of FIG. 6, the license issuing apparatus 101 which received the license issuing request obtains license information which is necessary for installation based on the list of applications included in the license issuing request and transmits it to the image forming apparatus 102.

The CPU 208 of the image forming apparatus 102 receives the license information through the network I/F 206. Thus, in step S405, the CPU 208 installs the application by using the license information. In the embodiment, for example, by executing the process of step S405, an example of installing means is realized.

Subsequently, an example of a process at the time when the license issuing apparatus 101 receives the product information inquiry request from the image forming apparatus 102 in step S402 in FIG. 4 will be described with reference to the flowchart of FIG. 5.

In step S501, the CPU 303 of the license issuing apparatus 101 waits until an access of the product inquiry request is received from the network I/F 306 through the Internet 106. If it is decided that the access of the product inquiry request has been received, step S502 follows.

In step S502, the CPU 303 obtains "license number and state information" included in the product inquiry request received from the network I/F 306 and searches for information of the product associated with the license number from the hard disk 304. Based on the state information, the CPU 303 obtains information of the installable applications from the applications included in the information of the product. A detailed process of step S502 will be described by a flowchart of FIG. 11.

Subsequently, in step S503, the network I/F 306 transmits the product information (refer to FIG. 15, which will be described hereinafter) based on the information obtained by the CPU 303 to the image forming apparatus 102 which accessed the license issuing apparatus 101 through the Internet 106. In the embodiment, for example, by executing the process of step S503, an example of output means, second output means, and third output means is realized.

Subsequently, an example of a process at the time when the license issuing apparatus 101 has received the license issuing request from the image forming apparatus 102 in step S404 in FIG. 4 will be described with reference to a flowchart of FIG. 6.

In step S601, the CPU 303 of the license issuing apparatus 101 waits until an access of the license issuing request is received from the network I/F 306 through the Internet 106. If it is decided that the access of the license issuing request has been received, step S602 follows. In the embodiment, for example, by executing the process of step S601, an example of fourth obtaining means is realized.

In step S602, the CPU 303 obtains "list of applications selected by the user" included in the license issuing request received from the network I/F 306 and issues license files of the applications. The CPU 303 calculates installing order of the list of issued license files based on a dependent relation of the applications stored in the hard disk 304. A detailed process of step S602 will be described by a flowchart of FIG. 24.

Subsequently, in step S603, the network I/F 306 transmits license information including the license files and their installing order to the image forming apparatus 102 which accessed the license issuing apparatus 101 through the Internet 106. In the embodiment, for example, by executing the process of step S603, an example of fourth output means is realized.

Subsequently, an example of details of a process of the product inquiry requesting process which is executed in step S402 in FIG. 4 will be described with reference to a flowchart of FIG. 7.

In step S701, the CPU 208 of the image forming apparatus 102 obtains the license number input by the user by the license number input display screen.

Subsequently, in step S702, the CPU 208 obtains "list of application IDs for specifying the applications which have already been installed" stored into the hard disk 209. Further, in step S703, the CPU 208 obtains "list of hardware IDs for identifying the apparatuses (for example, external controller 107) connected to the image forming apparatus 102" stored in the hard disk 209.

Subsequently, in step S704, the CPU 208 sets the list of application IDs of the installed applications and the list of hardware IDs of the apparatuses connected to the image forming apparatus 102 into state information. The network I/F 206 transmits the license number obtained in step S701 and the state information to the license issuing apparatus 101 through the Internet 106 and requests it to inquire about the product information.

Figures 7, 8:
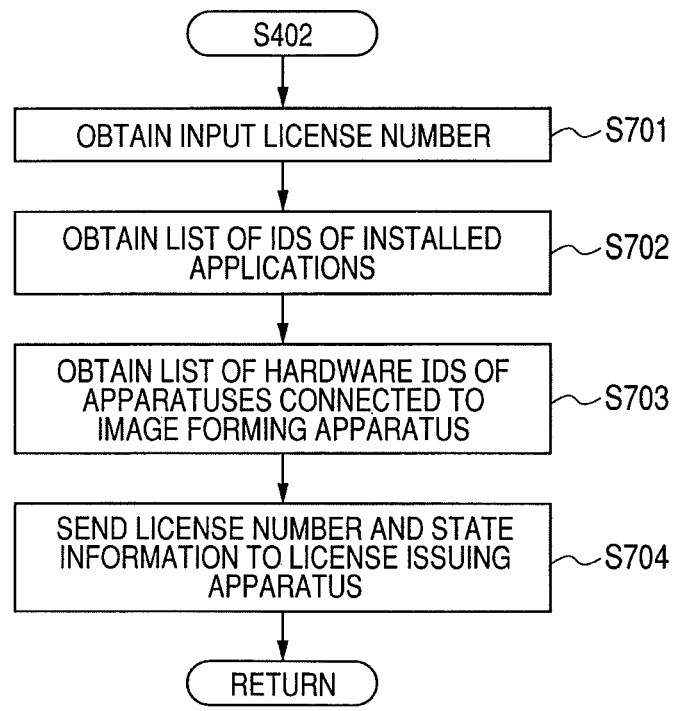
FIG. 7 is flowchart for describing an example of details of the product inquiry requesting process which is executed in step S402 in FIG. 4.
FIG. 8 is diagram illustrating an example of a list of application IDs of installed applications.

FIG. 8 is a diagram illustrating an example of the "list of application IDs of the installed applications" stored in the hard disk 209 of the image forming apparatus 102a. It is obtained in step S702 in FIG. 7.

An installed application table 801 is a table for storing the list of applications installed in the image forming apparatus 102. The installed application table 801 has an application ID column 802 and an application name column 803.

The application ID column 802 is a column for holding the application IDs of the installed applications. The application name column 803 is a column for holding the names of the installed applications.

In the installed application table 801, those information has been stored in a mutually corresponding relational manner.

In the example illustrated in FIG. 8, it is shown that SEND whose application ID is equal to A0001 and VNC whose application ID is equal to A0014 have already been installed as installed applications in the image forming apparatus 102.

Figures 9, 10:
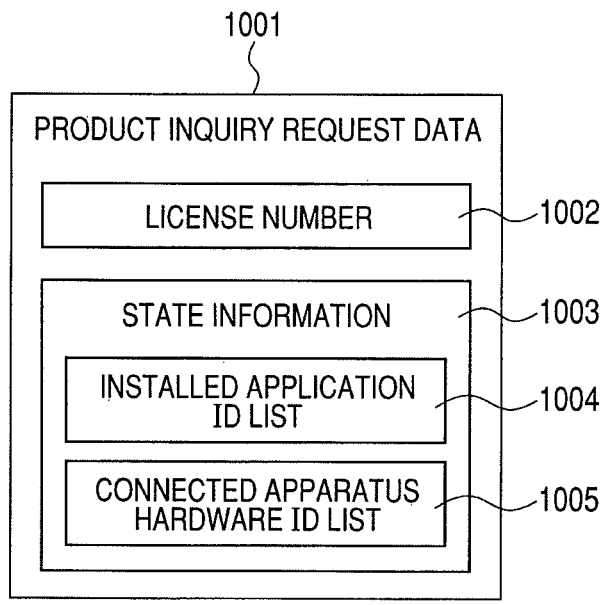
FIG. 9 is diagram illustrating an example of a list of hardware IDs of apparatuses connected to the image forming apparatus.
FIG. 10 is diagram illustrating an example of a format of data which is transmitted from the image forming apparatus to the license issuing apparatus in step S704 in FIG. 7.

FIG. 9 is a diagram illustrating an example of "list of hardware IDs of the apparatuses connected to the image forming apparatus 102a" which is obtained from the hard disk 209 of the image forming apparatus 102a in step S703 in FIG. 7.

A connected apparatus table 901 is a table for holding a list of apparatuses connected to the image forming apparatus 102a. The connected apparatus table 901 has a hardware ID column 902 and an apparatus name column 903.

The hardware ID column 902 is a column for holding the hardware IDs of the apparatuses connected to the image forming apparatus 102. The apparatus name column 903 is a column for holding the names of the apparatuses connected to the image forming apparatus 102.

In the connected apparatus table 901, those information has been stored in a mutually corresponding relational manner.

In the example illustrated in FIG. 9, it is shown that a scanner whose hardware ID is equal to H001, a printer whose hardware ID is equal to H004, a finisher whose hardware ID is equal to H010, and an external controller whose hardware ID is equal to H127 are connected to the image forming apparatus 102a.

FIG. 10 is a diagram illustrating an example of a format of data which is transmitted from the image forming apparatus 102 to the license issuing apparatus 101 in step S704 in FIG. 7. Product inquiry request data 1001 includes a license number 1002 and state information 1003. The state information 1003 includes a list of application IDs of the installed applications (installed application ID list) 1004 and a list of hardware IDs of the apparatuses connected to the image forming apparatus 102 (connected apparatus hardware ID list) 1005.

In the case of the image forming apparatus 102a having the data illustrated in FIGS. 8 and 9, the data which is stored in the installed application ID list 1004 is A0001 and A0014. The data which is stored in the connected apparatus hardware ID list 1005 is H001, H004, H010, and H127.

Subsequently, an example of details of a process for obtaining the product information in step S502 in FIG. 5 will be described with reference to a flowchart of FIG. 11.

In step S1101, the CPU 303 of the license issuing apparatus 101 obtains "license number 1002 and state information 1003" received from the network I/F 306.

Subsequently, in step S1102, the CPU 303 discriminates whether or not the license number 1002 received in step S1101 is included in a product table 1201 stored in the hard disk 304.

FIG. 12 is a diagram illustrating an example of the product table 1201 stored in the hard disk 304 of the license issuing apparatus 101.

In FIG. 12, a product ID 1202 is an ID for unconditionally specifying the product. A product name 1203 is a product name of the product. A license number 1204 is a number adapted to install the product. A construction application ID 1205 is a list of application IDs (construction application IDs) of one or more applications constructing the product. In the product table 1201, those information has been stored in a mutually corresponding relational manner.

Figure 11B:
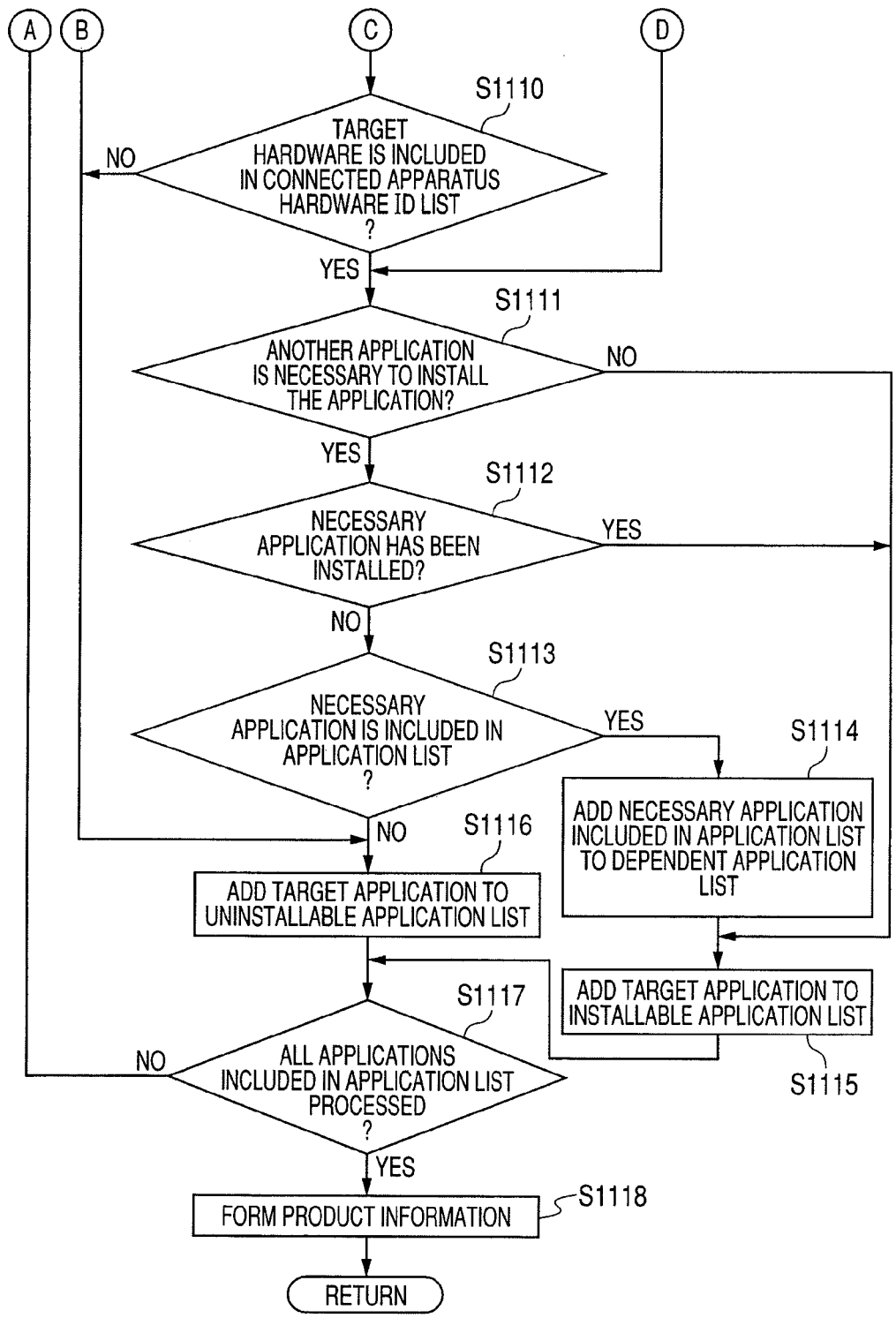
FIG. 11 is comprised of FIGS. 11A and 11B showing, flowcharts for describing an example of details of a process for obtaining the product information in step S502 in FIG. 5.

Returning to the description of FIG. 11, as a result of the discrimination of step S1102, if the license number 1002 received in step S1101 is not included in the product table 1201 and there are no products associated with the license number 1002, step S1103 follows. In step S1103, the CPU 303 executes an error process in the case where the license number 1002 is not registered.

If the license number 1002 received in step S1101 is included in the product table 1201 and a product associated with the license number 1002 exists, step S1104 follows. In step S1104, the CPU 303 obtains the list of application IDs from the construction application ID 1205 as a list of applications associated with the license number 1002.

Subsequently, in step S1105, the CPU 303 obtains one application ID from the list of application IDs obtained in step S1104.

Subsequently, in step S1106, the CPU 303 discriminates whether or not the application ID obtained in step S1105 is included in "installed application ID list 1004" in the state information 1003 obtained in step S1101.

As a result of the discrimination, if the application ID obtained in step S1105 is included in the installed application ID list 1004, the application of this application ID is not installed. Therefore, the processing routine advances to step S1116, which will be described hereinafter. On the other hand, if the application ID obtained in step S1105 is not included in the installed application ID list 1004, step S1107 follows.

Subsequently, in step S1107, the CPU 303 discriminates whether or not the application specified by the application ID obtained in step S1105 becomes unnecessary if hardware exists. For this purpose, the CPU 303 searches for a record having the application ID obtained in step S1105 from an application table 1301 stored in the hard disk 304. Subsequently, the CPU 303 obtains data of a column of an exclusive hardware ID 1306 from the record obtained by searching.

FIG. 13 is a diagram illustrating an example of the application table 1301 stored in the hard disk 304 of the license issuing apparatus 101.

In FIG. 13, an application ID 1302 is an ID for unconditionally specifying the application. An application name 1303 is a name of the application. A dependent application ID 1304 is an application ID of the application which needs to be installed prior to installing the above application. A dependent hardware ID 1305 is a hardware ID of the apparatus (apparatus which is connected to the image forming apparatus 102) which has to be connected to the image forming apparatus 102 prior to installing the above application. The exclusive hardware ID 1306 is a hardware ID of the apparatus (apparatus which is connected to the image forming apparatus 102) in which there is no need to install the above application if this apparatus has been connected to the image forming apparatus 102. In the application table 1301, those information has been stored in a mutually corresponding relational manner.

Figures 14, 15:
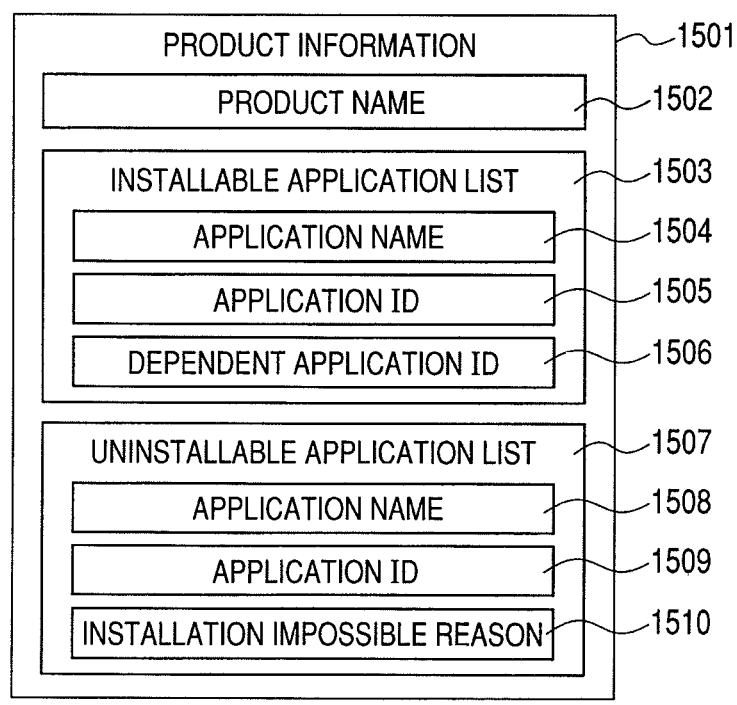
FIG. 14 is diagram illustrating an example of a connected apparatus table.
FIG. 15 is diagram illustrating an example of the product information.

FIG. 14 is a diagram illustrating an example of a connected apparatus table 1401 stored in the hard disk 304 of the license issuing apparatus 101.

In FIG. 14, a hardware ID 1402 is an ID for unconditionally specifying the apparatus which is connected to the image forming apparatus 102. An apparatus name 1403 is a name of the apparatus which is connected to the image forming apparatus 102. In the connected apparatus table 1401, those information has been stored in a mutually corresponding relational manner.

Returning to the description of FIG. 11, as a result of the discrimination of step S1107, if the data of the exclusive hardware ID 1306 does not exist in the record having the application ID obtained in step S1105, step S1109 follows. That is, the CPU 303 does not determine that the application specified by the application ID obtained in step S1105 becomes unnecessary if hardware exists, and advances to step S1109.

If the data of the exclusive hardware ID 1306 exists in the record having the application ID obtained in step S1105, step S1108 follows. That is, the CPU 303 determines that the application specified by the application ID obtained in step S1105 is the application which becomes unnecessary if hardware exists, and advances to step S1108.

In step S1108, the CPU 303 discriminates whether or not the data of the exclusive hardware ID 1306 obtained in step S1107 is included in the connected apparatus hardware ID list 1005 in the state information 1003 obtained in step S1101. As a result of the discrimination, if the data of the exclusive hardware ID 1306 obtained in step S1107 is included in the connected apparatus hardware ID list 1005 in the state information 1003 obtained in step S1101, the application as a processing target is not installed. Therefore, the processing routine advances to step S1116, which will be described hereinafter. On the other hand, if the data of the exclusive hardware ID 1306 obtained in step S1107 is not included in the connected apparatus hardware ID list 1005 in the state information 1003 obtained in step S1101, step S1109 follows.

In step S1109, the CPU 303 discriminates whether or not hardware is necessary to install the application specified by the application ID obtained in step S1105. For this purpose, the CPU 303 obtains data of the column of the dependent hardware ID 1305 from the record having the application ID obtained in step S1105. If the data of the dependent hardware ID 1305 does not exist in the record having the application ID obtained in step S1105, step S1111 follows. That is, the CPU 303 does not determine that hardware is necessary to install the application specified by the application ID obtained in step S1105, and advances to step S1111.

If the data of the dependent hardware ID 1305 exists in the record having the application ID obtained in step S1105, step S1110 follows. That is, the CPU 303 determines that hardware is necessary to install the application specified by the application ID obtained in step S1105, and advances to step S1110.

In step S1110, the CPU 303 discriminates whether or not the data of the dependent hardware ID 1305 obtained in step S1109 is included in the connected apparatus hardware ID list 1005 in the state information 1003 obtained in step S1101. As a result of the discrimination, if the data of the dependent hardware ID 1305 obtained in step S1109 is not included in the connected apparatus hardware ID list 1005 in the state information 1003 obtained in step S1101, the application as a processing target is not installed. Therefore, the processing routine advances to step S1116, which will be described hereinafter. On the other hand, if the data of the dependent hardware ID 1305 obtained in step S1109 is included in the connected apparatus hardware ID list 1005 in the state information 1003 obtained in step S1101, step S1111 follows.

In step S1111, the CPU 303 executes the following process. That is, the CPU 303 discriminates whether or not another application is necessary to install the application specified by the application ID obtained in step S1105. For this purpose, the CPU 303 obtains data of the column of the dependent application ID 1304 from the record having the application ID obtained in step S1105. If the data of the column of the dependent application ID 1304 does not exist in the record having the application ID obtained in step S1105, in order to set the application as a processing target to a target to be installed, the processing routine advances to step S1115, which will be described hereinafter.

If the data of the column of the dependent application ID 1304 exists in the record having the application ID obtained in step S1105, step S1112 follows. That is, it is determined that another application is necessary to install the application specified by the application ID obtained in step S1105, and step S1112 follows.

Subsequently, in step S1112, the CPU 303 executes the following process. That is, the CPU 303 discriminates whether or not the data of the dependent application ID 1304 obtained in step S1111 is included in the installed application ID list 1004 in the state information 1003 obtained in step S1101.

As a result of the discrimination, if the data of the dependent application ID 1304 is included in the installed application ID list 1004 in the state information 1003, in order to set the application as a processing target to a target to be installed, the processing routine advances to step S1115. If the data of the dependent application ID 1304 is not included in the installed application ID list 1004 in the state information 1003, step S1113 follows.

In step S1113, the CPU 303 discriminates whether or not the data of the dependent application ID 1304 obtained in step S1111 is included in the list of application IDs obtained in step S1104. As a result of the discrimination, if the data of the dependent application ID 1304 is not included in the application ID list, in order to prevent the processing target application from being installed, the processing routine advances to step S1116.

On the other hand, if the data of the dependent application ID 1304 is included in the application ID list, step S1114 follows.

In step S1114, the CPU 303 executes the following process. That is, the dependent application ID 1304 obtained in step S1111 is added into the memory 305 as an ID of the dependent application necessary for installing the application specified by the application ID obtained in step S1105.

In the embodiment, for example, by executing the process of step S1114, an example of forming means is realized.

Subsequently, in step S1115, the CPU 303 adds the application ID obtained in step S1105 into the memory 305 as a list of IDs of the installable applications. Then, step S1117 follows.

When the processing routine advances to step S1116 from step S1106, S1108, S1110, or S1113, the CPU 303 executes the following process. That is, the CPU 303 adds the application ID obtained in step S1105 and a reason why the application specified by the application ID cannot be installed to the memory 305 as a list of IDs of the uninstallable applications. Then, step S1117 follows.

In step S1117, the CPU 303 discriminates whether or not the processes of steps S1106 to S1115 have been executed with respect to all of the application IDs obtained in step S1104. As a result of the discrimination, if the processes are not executed with respect to all of the application IDs obtained in step S1104, the processing routine is returned to step S1105. On the other hand, if the processes have been executed with respect to all of the application IDs obtained in step S1104, step S1118 follows.

In step S1118, the CPU 303 forms product information 1501 having a structure as illustrated in FIG. 15 and stores it into the memory 305.

As mentioned above, in the embodiment, for example, by executing the process of step S1101, an example of obtaining means of the information distributing apparatus, second obtaining means, and third obtaining means is realized. For example, by executing the processes of steps S1105, S1113, and S1117, an example of specifying means is realized. For example, by executing the processes of steps S1115 and S1116, an example of second forming means and third forming means is realized.

For example, by the list of IDs of the installable applications and the list of IDs of the uninstallable applications, an example of information showing whether or not it is necessary to install the program into the information processing apparatus is realized.

FIG. 15 is a diagram illustrating an example of the product information 1501 held in the memory 305 of the license issuing apparatus 101.

In FIG. 15, a product name 1502 is a data area for storing the name of the product.

An installable application list 1503 is a data area for storing one or more installable applications among the applications constructing the product.

An application name 1504 is a data area for storing the application name of the installable application.

An application ID 1505 is a data area for storing the application ID of the installable application.

A dependent application ID 1506 is a data area for storing the application ID of the application which needs to be preliminarily installed in order to install the installable application.

An uninstallable application list 1507 is a data area for storing one or more uninstallable applications among the applications constructing the product.

An application name 1508 is a data area for storing the application name of the uninstallable application.

An application ID 1509 is a data area for storing the application ID of the uninstallable application.

An installation impossible reason 1510 is a data area for storing the reason why the installation is impossible.

The product name 1203 of the record corresponding to the license number 1002 obtained in step S1102 is stored in the product name 1502.

In the installable application list 1503, a plurality of data areas are prepared for the number of IDs of the installable applications added in step S1115. In each of the prepared data areas, the name of the application specified by the ID of the installable application added in step S1115 is stored in the application name 1504. In each of the prepared data areas, the ID of the installable application added in step S1115 is stored in the application ID 1505.

The following information is stored in the dependent application ID 1506. That is, when the dependent application exists for the application specified by the ID of the installable application added in S1115, the ID of the dependent application added in S1114 is stored.

In the uninstallable application list 1507, a plurality of data areas are prepared for the number of IDs of the uninstallable applications added in step S1116. The name of the application specified by the ID of the uninstallable application added in step S1116 is stored in the application name 1508. The application ID of the uninstallable application added in step S1116 is stored in the application ID 1509. The reason why the application specified by the ID of the uninstallable application added in step S1116 cannot be installed is stored in the installation impossible reason 1510.

By executing the flowchart of FIG. 11 as mentioned above, the CPU 303 of the license issuing apparatus 101 forms the following product information 1501. That is, in addition to the information of the installable application and the uninstallable application, with respect to the installable application, the product information 1501 in which the information of the application which needs to be preliminarily installed has been held is formed.

Figure 5:
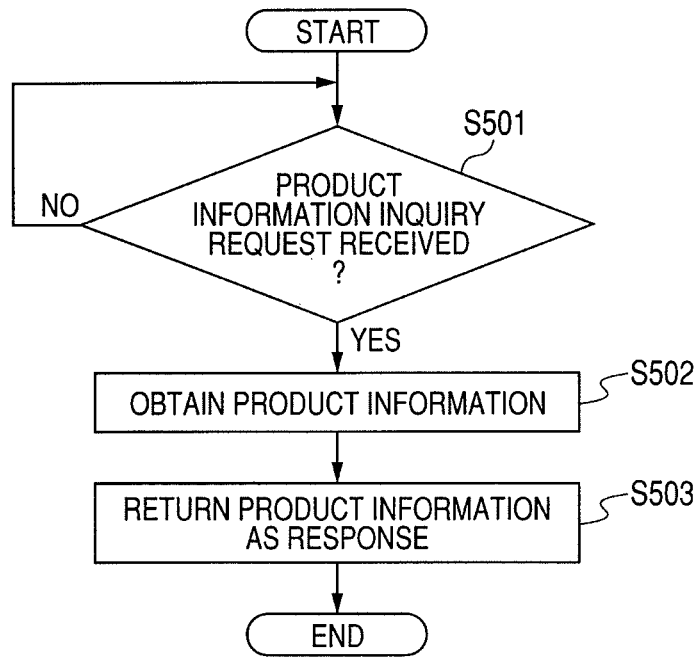
FIG. 5 is flowchart for describing an example of a process at the time when the license issuing apparatus has received a product information inquiry request from the image forming apparatus in step S402 in FIG. 4.

In step S503 in FIG. 5, the product information 1501 is returned as a response to the image forming apparatus 102 (image forming apparatus 102 which accessed the license issuing apparatus 101) on an inquiring source side of the product.

Subsequently, an example of details of the process in which the image forming apparatus 102 which received the product information from the license issuing apparatus 101 allows the installation application selection display screen to be displayed in step S403 in FIG. 4 will be described with reference to a flowchart of FIG. 16.

In step S1601, the CPU 208 of the image forming apparatus 102 receives the product information 1501 through the network I/F 206 and stores it into the hard disk 209.

Subsequently, in step S1602, the CPU 208 obtains the product name 1502 from the product information 1501 received in step S1601 and sets the product name 1502 as a text of a label which is displayed.

Subsequently, in step S1603, the CPU 208 obtains the installable application list 1503 from the product information 1501 received in step S1601.

Subsequently, in step S1604, the CPU 208 takes out the information of one installable application from the installable application list 1503 obtained in step S1603.

Subsequently, in step S1605, the CPU 208 sets the application name 1504 of the installable application obtained in step S1604 into a text of a checkbox for allowing the user to select the application.

Subsequently, in step S1606, the CPU 208 checks the checkbox set in step S1605.

Subsequently, in step S1607, the CPU 208 discriminates whether or not the processes have been executed for all of the installable applications in the installable application list 1503. As a result of the discrimination, if the processes have not been executed for all of the installable applications in the list 1503 yet, the processing routine is returned to step S1604 and steps S1604 to S1607 are repetitively executed until the processes are completed. When the processes are completed for all of the installable applications in the list 1503, the processing routine advances to step S1608.

In step S1608, the CPU 208 obtains the uninstallable application list 1507 from the product information 1501 received in step S1601.

Subsequently, in step S1609, the CPU 208 takes out the information of one uninstallable application from the uninstallable application list 1507 obtained in step S1608.

Subsequently, in step S1610, the CPU 208 executes the following process. That is, the CPU 208 sets the application name 1508 of the uninstallable application obtained in step S1609 and the installation impossible reason 1510 into the text of the checkbox for allowing the user to select the application.

Subsequently, in step S1611, the CPU 208 unchecks the checkbox set in step S1610.

Subsequently, in step S1612, the CPU 208 invalidates the checkbox set in step S1610 so that the user cannot edit.

Subsequently, in step S1613, the CPU 208 discriminates whether or not the processes have been executed for all of the uninstallable applications in the uninstallable application list 1507. As a result of the discrimination, if the processes have not been executed for all of the uninstallable applications in the list 1507 yet, the processing routine is returned to step S1609 and steps S1609 to S1613 are repetitively executed until the processes are completed. When the processes are completed for all of the uninstallable applications in the list 1507, the processing routine advances to step S1614.

In step S1614, the CPU 208 allows the installation application selection display screen to be displayed on the display unit 212 based on the information formed in steps S1602 to S1613.

As mentioned above, in the embodiment, for example, by executing the process of step S1601, an example of obtaining means of the information processing apparatus and the second obtaining means is realized. For example, by executing the processes of steps S1602 to S1604, an example of display means is realized.

Figure 16:
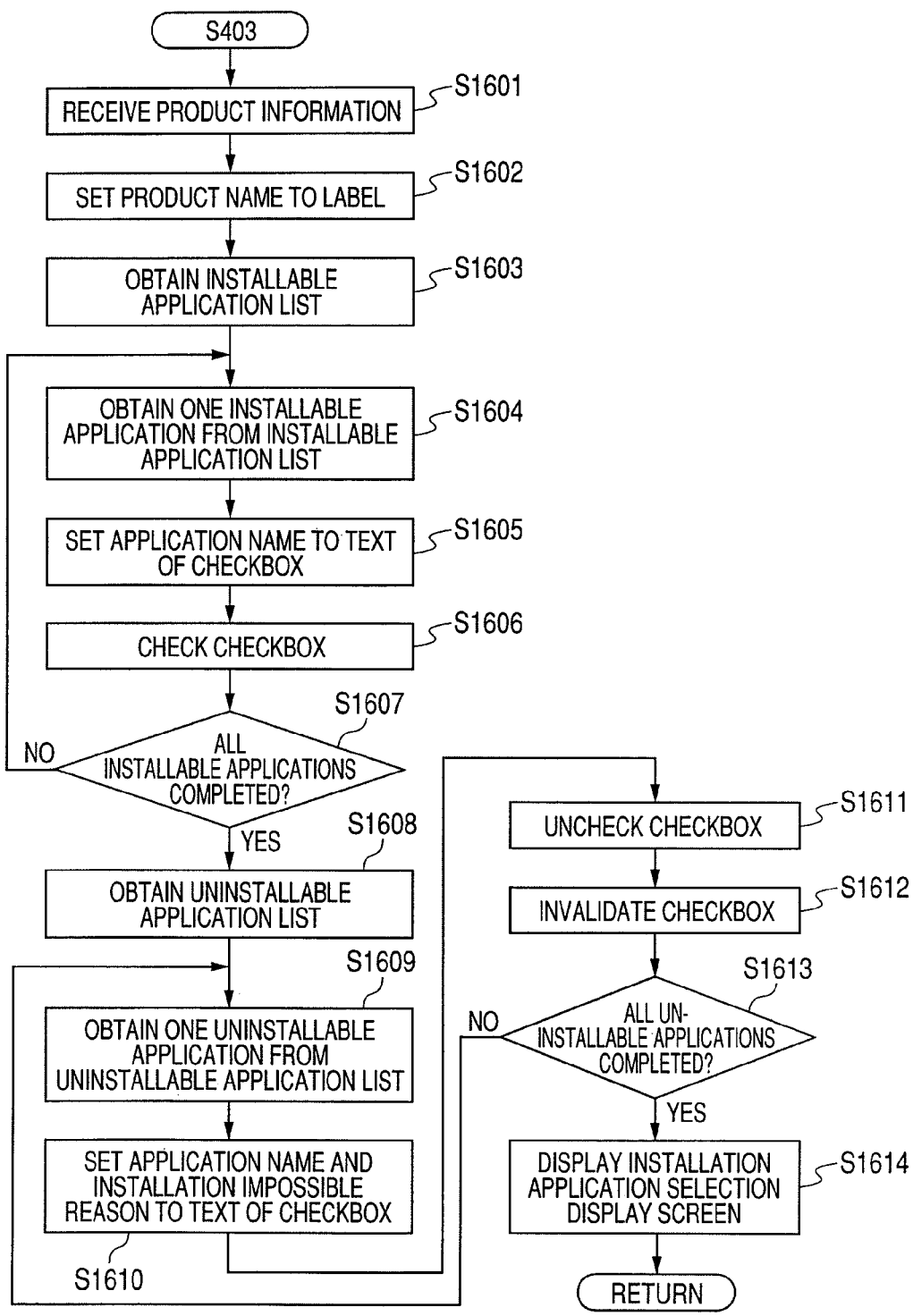
FIG. 16 is flowchart for describing an example of details of a process in which the image forming apparatus which received the product information from the license issuing apparatus allows an installation application selection display screen to be displayed in step S403 in FIG. 4.

By executing the flowchart of FIG. 16, the checkboxes which can select only the installable applications are displayed on the display unit 212 of the image forming apparatus 102 and the user is enabled to select the checkboxes.

FIG. 17 is a diagram illustrating a first example of the installation application selection display screen. An installation application selection display screen 1700a is displayed under the following conditions. That is, it is assumed that the applications illustrated in FIG. 8 have already been installed in the image forming apparatus 102a. It is also assumed that the apparatuses illustrated in FIG. 9 have already been connected to the image forming apparatus 102a. It is also assumed that the license number LN727 was input by the user in step S401 in FIG. 4.

FIG. 18 is a diagram illustrating an example of "list of hardware IDs of the apparatuses connected to the image forming apparatus 102a" which is obtained from the hard disk 209 of the image forming apparatus 102b in step S703 in FIG. 7.

Figures 19, 20:
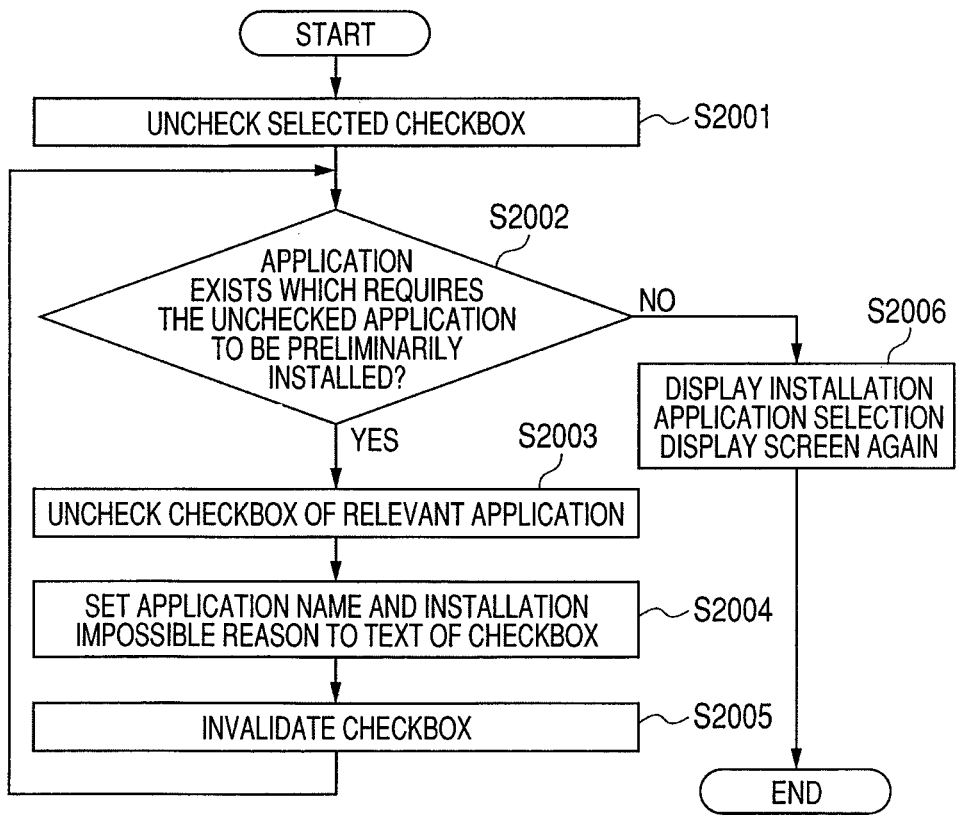
FIG. 19 is diagram illustrating a second example of the installation application selection display screen.
FIG. 20 is flowchart for describing an example of a process in the image forming apparatus in the case where, on the installation application selection display screen, the user unchecked a checkbox of an application which is installed.

FIG. 19 is a diagram illustrating a second example of the installation application selection display screen.

In the case of a state where the apparatuses illustrated in FIG. 18 have been connected to the image forming apparatus 102b, since the external controller whose hardware ID is equal to H127 is not connected to the image forming apparatus 102b, an installation application selection display screen 1700b as illustrated in FIG. 19 is displayed. That is, in the installation application selection display screen 1700a, the system is in a state where a page description language 1, a page description language 2, and a page description language 3 cannot be selected. However, in the installation application selection display screen 1700b, the system enters a state where the page description language 1, page description language 2, and page description language 3 can be selected. This is because those functions become unnecessary in the image forming apparatus 102a due to the existence of the external controller.

Subsequently, an example of a process in the image forming apparatus 102 in the case where, on the installation application selection display screen, the user unchecked the checkbox of the application which is installed will be described with reference to a flowchart of FIG. 20.

In step S2001, the CPU 208 of the image forming apparatus 102 unchecks the checkbox selected by the user.

Subsequently, in step S2002, the CPU 208 discriminates whether or not an application ID of the application corresponding to the unchecked checkbox exists in the dependent application ID 1506 in another application. That is, the CPU 208 discriminates whether or not an application exists which requires the application corresponding to the unchecked checkbox to be preliminarily installed. As a result of the discrimination, if the application ID of the application corresponding to the unchecked checkbox does not exist in the dependent application ID 1506 in another application, step S2006 follows. The CPU 208 allows the installation application selection display screen to be displayed again so that the contents of the process of step S2001 are reflected.

On the other hand, if the application ID of the application corresponding to the unchecked checkbox exists in the dependent application ID 1506 in another application, step S2003 follows.

In step S2003, the CPU 208 obtains the checkbox of the application which requires the application corresponding to the unchecked checkbox to be preliminarily installed, and unchecks the checkbox.

Subsequently, in step S2004, the CPU 208 executes the following process. That is, the CPU 208 sets the name of the application corresponding to the checkbox and, as a reason why the application cannot be installed, a character string of a message showing that the dependent application is not selected into the text of the checkbox obtained in step S2003.

Subsequently, in step S2005, the CPU 208 invalidates the checkbox obtained in step S2003. Returning to step S2002, the CPU 208 discriminates whether or not an application exists which requires the application corresponding to the checkbox unchecked in step S2003 to be preliminarily installed. This discrimination can be made by discriminating whether or not the application ID of the application corresponding to the unchecked checkbox exists in the dependent application ID 1506 in another application.

As a result of the discrimination, if the application which requires the application corresponding to the checkbox unchecked in step S2003 to be preliminarily installed exists, the processes of steps S2003 to S2005 are repeated. If the application which requires the application corresponding to the checkbox unchecked in step S2003 to be preliminarily installed does not exist, step S2006 follows. The CPU 208 allows the installation application selection display screen to be displayed again so that the contents of the processes of steps S2001 to S2005 are reflected.

As mentioned above, in the embodiment, for example, by executing the processes of steps S2001 to S2006, an example of the display means is realized.

Figures 21, 22:
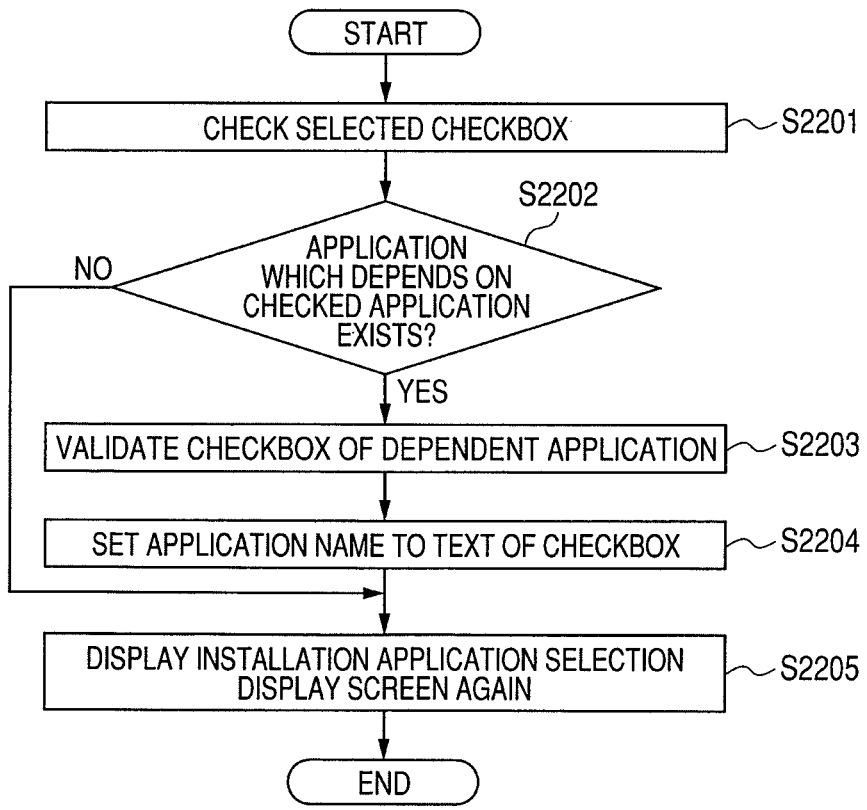
FIG. 21 is diagram illustrating an example of an installation application selection display screen which is displayed in the case where, on the installation application selection display screen of FIG. 19, the user unchecked a checkbox of a page description language 1.
FIG. 22 is flowchart for describing an example of a process in the image forming apparatus in the case where, on the installation application selection display screen, the user checked a checkbox of an application which is installed.

FIG. 21 is a diagram illustrating an example of an installation application selection display screen which is displayed by executing the processes in FIG. 20 in the case where the user unchecked the checkbox of the page description language 1 on the installation application selection display screen 1700*b* illustrated in FIG. 19.

In an installation application selection display screen 1700*c* of FIG. 21, the checkbox of the page description language 2, which requires the page description language 1 to be preliminarily installed, is unchecked when the checkbox of the page description language 1 is unchecked. Thus, the selection of the page description language 2 is invalidated. Further, in association with it, the checkbox of the page description language 3, which requires the page description language 2 to be preliminarily installed, is also unchecked. Therefore, the selection of the page description language 3 is also invalidated.

Subsequently, an example of a process in the image forming apparatus 102 in the case where the user checked a checkbox of an application which is installed on the installation application selection display screen will be described with reference to a flowchart of FIG. 22.

In step S2201, the CPU 208 of the image forming apparatus 102 checks the checkbox selected by the user.

Subsequently, in step S2202, the CPU 208 discriminates whether or not the application ID of the application corresponding to the checked checkbox exists in the dependent application ID 1506 in another application. That is, the CPU 208 discriminates whether or not an application exists which requires the application corresponding to the checked checkbox to be preliminarily installed. As a result of the discrimination, if the application ID of the application corresponding to the checked checkbox does not exist in the dependent application ID 1506 in another application, step S2205 follows. The CPU 208 allows the installation application selection display screen to be displayed again so that the contents of the process of step S2201 are reflected.

On the other hand, if the application ID of the application corresponding to the checked checkbox exists in the dependent application ID 1506 in another application, step S2203 follows.

In step S2203, the CPU 208 obtains the checkbox of the application which depends on the application corresponding to the checked checkbox and validates the checkbox.

Subsequently, in step S2204, the CPU 208 sets the name of the application corresponding to the checkbox into the text of the checkbox obtained in step S2203.

Subsequently, in step S2205, the CPU 208 allows the installation application selection display screen to be displayed again so that the contents of the processes of steps S2201 to S2204 are reflected.

As mentioned above, in the embodiment, for example, by executing the processes of steps S2201 to S2205, an example of the display means is realized.

FIG. 23 is a diagram illustrating an example of an installation application selection display screen which is displayed by executing the processes in FIG. 22 in the case where the user checked the checkbox of the page description language 1 on the installation application selection display screen illustrated in FIG. 21.

On an installation application selection display screen 1700*d* in FIG. 23, the selection of the page description language 2 which requires the page description language 1 to be preliminarily installed is validated.

As mentioned above, in the embodiment, the application whose installation is unnecessary is discriminated from a situation of the installation of the application of the image forming apparatus 102 or a situation of the apparatus connected to the image forming apparatus 102. Further, the application whose installation is unnecessary is discriminated from a dependent relation based on the installing (activating) order of the application and a selecting state of the application by the user. Based on the result obtained by discriminating as mentioned above, a UI which cannot select the application that will be meaningless even if it is installed is provided, thereby avoiding that the license of the application which cannot be used in the image forming apparatus 102 is wastefully issued.

Figure 4:
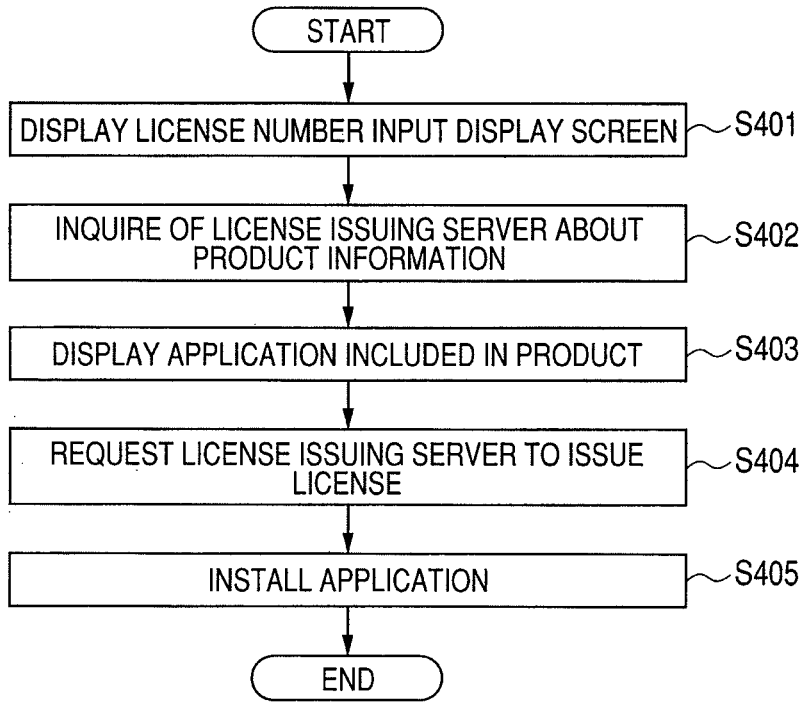
FIG. 4 is flowchart for describing an example of a process at the time when the image forming apparatus receives a license of an application from the license issuing apparatus and installs the application.

A list of the applications selected by the user on the installation application selection display screen is transmitted as a license issuing request to the license issuing apparatus 101 by the CPU 208 of the image forming apparatus 102 in step S404 in FIG. 4. The transmitted license issuing request is received by the CPU 303 of the license issuing apparatus 101 in step S601 in FIG. 6 and the license issuing process in step S602 is executed.

Figure 24:
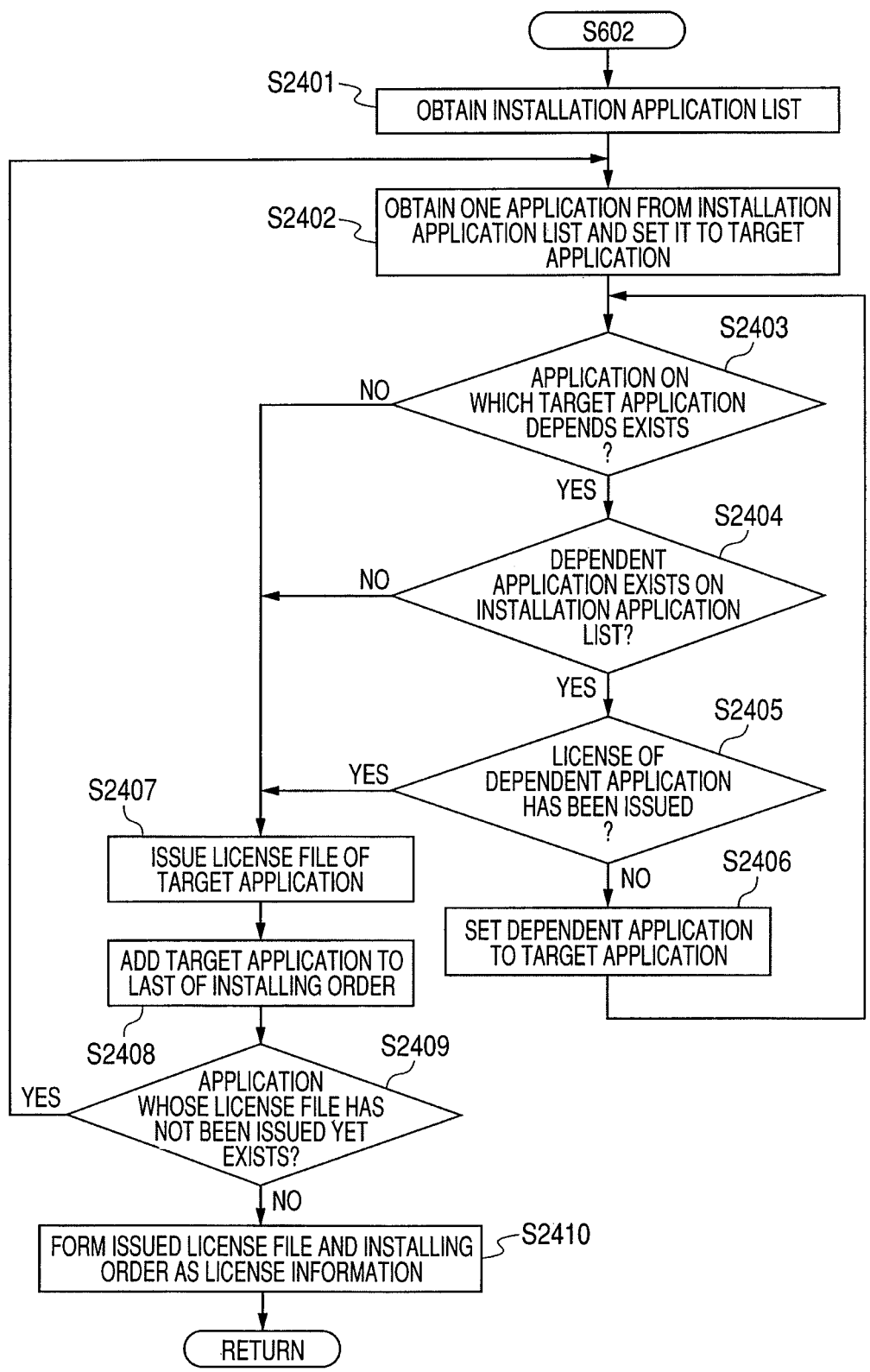
FIG. 24 is flowchart for describing an example of details of a process in the license issuing apparatus at the time of issuing a license file in step S602 in FIG. 6.

Subsequently, an example of details of a process in the license issuing apparatus 101 at the time of issuing a license file in step S602 in FIG. 6 will be described with reference to a flowchart of FIG. 24.

In step S2401, the CPU 303 of the license issuing apparatus 101 obtains "list of the applications" included in the license issuing request received by the network I/F 306. The list of the applications is a list of the applications selected by the user on the installation application selection display screen. In the following description, this list of the applications is called an installation application list as necessary.

Subsequently, in step S2402, the CPU 303 obtains one application from the installation application list and sets the application to a target application of license issuance.

Subsequently, in step S2403, the CPU 303 discriminates whether or not a dependent application which needs to be preliminarily installed in order to install the target application exists. This discrimination can be made by discriminating whether or not a dependent application ID exists in the record of the application ID of the target application in the application table 1301 illustrated in FIG. 13.

As a result of the discrimination, if the dependent application which needs to be preliminarily installed in order to install the target application does not exist, the processing routine advances to a license issuing process in step S2407. On the other hand, if the dependent application which needs to be preliminarily installed in order to install the target application exists, step S2404 follows.

In step S2404, the CPU 303 discriminates whether or not the dependent application detected in step S2403 exists in the installation application list obtained in step S2401. As a result of the discrimination, if the dependent application does not exist in the installation application list, the processing routine advances to the license issuing process in step S2407.

On the other hand, if the dependent application exists in the installation application list obtained in step S2401, step S2405 follows.

Subsequently, in step S2405, the CPU 303 discriminates whether or not the license file of the dependent application has been issued. As a result of the discrimination, if the license file of the dependent application has not been issued, step S2406 follows. The CPU 303 changes the target application to the dependent application and returns to step S2403.

On the other hand, if the license file of the dependent application has been issued, step S2407 follows in order to issue the license.

When the processing routine advances to step S2407 from step S2403, S2404, or S2405, the CPU 303 issues the license file of the target application.

Subsequently, in step S2408, as information of installing order, the CPU 303 adds information showing that the target application is installed after the application which is installed lastly among the applications whose installing order has already been registered.

Subsequently, in step S2409, the CPU 303 discriminates whether or not an application whose license file has not been issued yet exists in the installation application list obtained in step S2401.

As a result of the discrimination, if the application whose license file has not been issued yet exists in the installation application list, the processing routine is returned to step S2402. The CPU 303 obtains the application whose license file has not been issued yet from the installation application list and continues the processes of steps S2403 to S2408. When the license files of all of the installation applications in the list are issued, the processing routine advances to step S2410.

Subsequently, in step S2410, the CPU 303 stores the list of the license files issued in step S2407 and the installing order as license information into the memory 305.

As mentioned above, in the embodiment, for example, by executing the processes of steps S2402 to S2409, an example of deciding means is realized.

Figure 6:
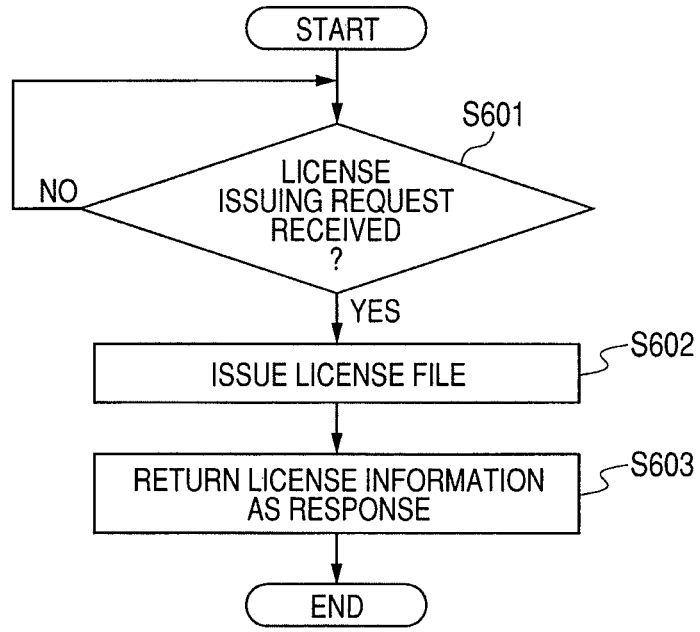
FIG. 6 is flowchart for describing an example of processes at the time when the license issuing apparatus has received a license issuing request from the image forming apparatus in step S404 in FIG. 4.

The license information stored in the memory 305 by the CPU 303 is returned to the image forming apparatus 102 as a response to the license issuing request in step S603 in FIG. 6.

After that, the image forming apparatus 102 which received the license information in step S405 in FIG. 4 obtains the license file included in the license information according to the installing order included in the license information and repeats the installing process of the application.

As mentioned above, the license issuing apparatus 101 automatically calculates the installing order of the application from the dependent relation of the application selected as an installation target by the user. The license issuing apparatus 101 transmits both of the license file and the installing order of the application based on the license file to the image forming apparatus 102. The image forming apparatus 102 installs the application in the received installing order.

By executing the processes as mentioned above, the user can normally install the application merely by selecting the application to be installed without being aware of the installing order of the application.

As mentioned above, in the embodiment, the license issuing apparatus 101 obtains the license number, the information regarding the apparatuses connected to the image forming apparatus 102, and the information regarding the applications installed in the image forming apparatus 102. With respect to each of the applications of the product specified by the license number, the license issuing apparatus 101 discriminates whether the application can be installed or cannot be installed. This discrimination is made based on the contents in the application table 1301, the information regarding the apparatuses connected to the image forming apparatus 102, and the information regarding the applications installed in the image forming apparatus 102. With respect to the installable application, an application which needs to be preliminarily installed in order to install the relevant application is specified. This discrimination is made based on the contents in the application table 1301. The license issuing apparatus 101 transmits the product information 1501 including those information to the image forming apparatus 102. Based on the product information 1501, the image forming apparatus 102 displays the installation application selection display screen which enables the installable application to be selected and disables the uninstallable application to be selected. Further, on the installation application selection display screen, with respect to the application in which the application which needs to be preliminarily installed exists, when the installation of the application which needs to be preliminarily installed is designated, the execution of the installation can be designated.

Therefore, the user can select only the proper installable applications among the applications included in the product.

In the embodiment, with respect to each application whose installation has been designated by the user of the image forming apparatus 102, the license issuing apparatus 101 discriminates whether or not an application which needs to be installed faster than such an application exists. This discrimination is made based on the contents in the application table 1301. Based on the discrimination result, the installing order of each application as an installation target is decided and the information of the installing order is transmitted to the image forming apparatus 102 together with each of the relevant applications.

Therefore, with respect to a plurality of applications whose installation has been selected, even if there is a restriction in the installing order, the user can execute the installing operation without being aware of it.

In the embodiment, the UI for installing the license has been displayed on the display unit 212 of the image forming apparatus 102. However, it is also possible to construct in such a manner that the image forming, apparatus 102 forms the UI in response to an inquiry from the client PC 103, returns the UI as a response to the client PC 103, and allows the UI to be displayed on the display unit 301 of the client PC. A Web browser may be used as a UI.

In the embodiment, the case where the uninstallable application is displayed in gray, thereby disabling the user to select such an application has been described as an example. However, it is not always necessary to use such a construction. For example, it is also possible to construct in such a manner that the information regarding the uninstallable application is not displayed.

In the embodiment, by searching the application table 1301, permission or inhibition of the installation of the application has been made or the application which needs to be preliminarily installed in order to install the application has been specified. However, it is not always necessary to use the application table 1301. For example, with respect to a plurality of programs whose installing order has been predetermined, information showing the installing order of the plurality of programs may be stored in place of the dependent application ID 1304.

<Second Embodiment>

Subsequently, another embodiment of the invention will be described. In the first embodiment, the applications constructing the product have been arranged and displayed at the same level on the installation application selection display screen (refer to FIGS. 17, 19, 21, and 23). When the user checks or unchecks the checkbox, the selection of the application having the dependent relation with the application corresponding to such a checkbox is validated or invalidated. However, in such UI (installation application selection display screen), until a checking state is changed, it is difficult for the user to know with which application, the checked application has the dependent relation. For example, there is a case where for an application A having the dependent relation with the checked application, an application B having the dependent relation further exists. In such a case, in the first embodiment, after a checkbox corresponding to the application A was once checked, the user has to check a checkbox corresponding to the application B.

In the embodiment, therefore, a case where a dependent relation between applications is enabled to be informed to the user by the UI (installation application selection display screen) so that he can easily understand it will be described as an example. As mentioned above, in the embodiment and the foregoing first embodiment, a part of processes regarding the dependent relation between the applications differs mainly. Therefore, in the description of the embodiment, by designating the same portions as those in the foregoing first embodiment by the same reference numerals as those added in FIGS. 1 to 24, or the like, a detailed description is omitted. For example, a system construction and a hardware construction are similar to those described by using FIGS. 1, 2, and 3 of the first embodiment. Processes on the license issuing apparatus 101 side are also similar to those in the first embodiment.

Figure 25B:
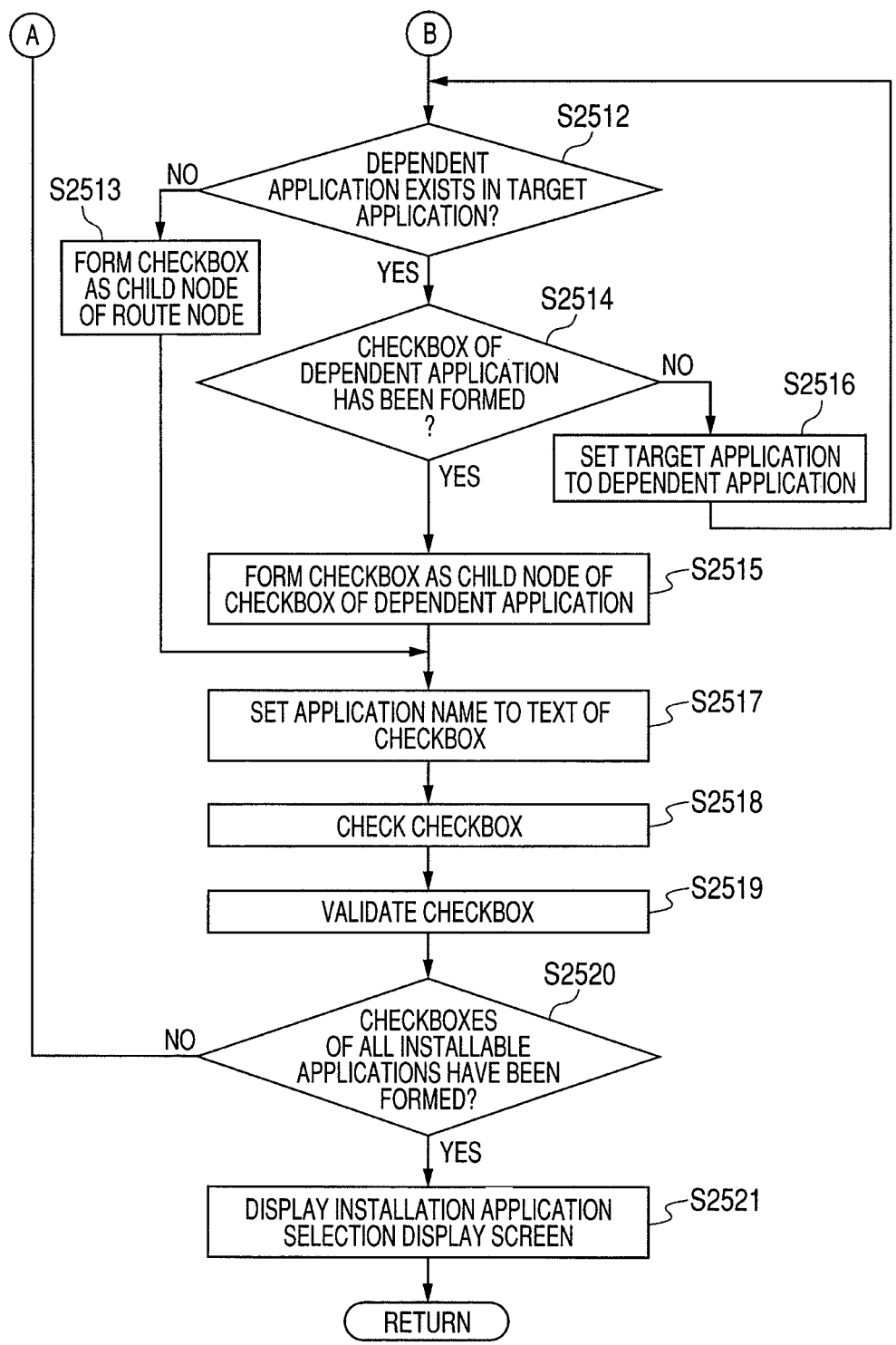
FIG. 25 is comprised of FIGS. 25A and 25B showing flowcharts for describing an example of details of a process in which the image forming apparatus which received the product information from the license issuing apparatus allows the installation application selection display screen to be displayed in step S403 in FIG. 4.

Further, processes in which the image forming apparatus 102 receives the license information from the license issuing apparatus 101 and installs the application are also similar to those in FIG. 4. However, processes which are executed until the installation application selection display screen is displayed after the image forming apparatus 102 received the product information 1501 are as illustrated in the following flowchart of FIG. 25. That is, the processes in the flowchart of FIG. 25 are executed in place of the flowchart illustrated in FIG. 16.

An example of details of a process in which the image forming apparatus 102 which received the product information 1501 from the license issuing apparatus 101 allows the installation application selection display screen to be displayed in step S403 in FIG. 4 will be described with reference to a flowchart of FIG. 25.

In step S2501, the CPU 208 of the image forming apparatus 102 receives the product information 1501 through the network I/F 206 and stores it into the hard disk 209.

Subsequently, in step S2502, the CPU 208 obtains the product name 1502 from the product information 1501 received in step S2501 and sets the product name 1502 as a text of a label which is displayed.

Subsequently, in step S2503, the CPU 208 obtains the uninstallable application list 1507 from the product information 1501 received in step S2501.

Subsequently, in step S2504, the CPU 208 takes out one uninstallable application from the uninstallable application list 1507 obtained in step S2503.

Subsequently, in step S2505, the CPU 208 adds one checkbox as a child node to a route node in order to form a tree view with a checkbox.

Subsequently, in step S2506, the CPU 208 executes the following process. That is, the CPU 208 sets the application name 1508 of the uninstallable application obtained in step S2504 and the installation impossible reason 1510 into the text of the checkbox formed in step S2505.

Subsequently, in step S2507, the CPU 208 unchecks the checkbox formed in step S2505.

Subsequently, in step S2508, the CPU 208 invalidates the checkbox set in step S2506 so that the user cannot edit it.

Subsequently, in step S2509, the CPU 208 discriminates whether or not the checkboxes of all applications included in the uninstallable application list 1507 obtained in step S2503 have been formed. As a result of the discrimination, if the checkboxes of all of the applications included in the uninstallable application list 1507 have not been formed yet, the processing routine is returned to step S2504. The processes in steps S2504 to S2509 are repetitively executed until the checkboxes of all of the applications included in the uninstallable application list 1507 are formed. If the checkboxes of all of the applications included in the uninstallable application list 1507 have been formed, step S2510 follows.

In step S2510, the CPU 208 obtains the installable application list 1503 from the product information 1501 received in step S2501.

Subsequently, in step S2511, the CPU 208 takes out information of one installable application from the installable application list 1503 obtained in step S2510. The CPU 208 sets the application corresponding to such information as a target application.

Subsequently, in step S2512, the CPU 208 discriminates whether or not a dependent application which needs to be installed before the target application is installed exists. This discrimination can be made by referring to the dependent application ID 1506 included in the product information 1501 received in step S2501.

As a result of the discrimination, if a dependent application which needs to be installed before the target application is installed exists, the processing routine advances to step S2514, which will be described hereinafter. On the other hand, if a dependent application which needs to be installed before the target application is installed does not exist, step S2513 follows. The CPU 208 adds one checkbox as a child node of the route node.

Subsequently, in step S2517, the CPU 208 sets the application name 1504 of the target application to a text of the checkbox added in step S2513.

Subsequently, in step S2518, the CPU 208 checks the checkbox set in step S2517.

Subsequently, in step S2519, the CPU 208 validates the checkbox set in step S2517 and the processing routine advances to step S2520, which will be described hereinafter.

As mentioned above, if it is determined in step S2512 that a dependent application which needs to be installed before the target application is installed exists, the processing routine advances to step S2514. The CPU 208 discriminates whether or not the checkbox of such a dependent application has been formed. As a result of the discrimination, if the checkbox of the dependent application has not been formed yet, step S2516 follows. The target application is changed to the dependent application and the processing routine is returned to step S2512. On the other hand, if the checkbox of the dependent application has been formed, step S2515 follows. The CPU 208 adds a checkbox as a child node of the checkbox corresponding to the dependent application.

Subsequently, in step S2517, the CPU 208 sets the application name 1504 of the target application to the checkbox added in step S2515. As mentioned above, the CPU 208 checks the checkbox in step S2518 and validates the checkbox in step S2519, then step S2520 follows.

Subsequently, in step S2520, the CPU 208 discriminates whether or not the checkboxes of all applications included in the installable application list 1503 obtained in step S2510 have been formed. As a result of the discrimination, if the checkboxes of all of the applications included in the installable application list 1503 are not formed yet, the processing routine is returned to step S2511. The processes in steps S2511 to S2520 are repetitively executed until the checkboxes of all of the applications included in the installable application list 1503 are formed. If the checkboxes of all of the applications included in the installable application list 1503 have been formed, step S2521 follows.

Subsequently, in step S2521, the CPU 208 allows the installation application selection display screen to be displayed again on the display unit 212 based on the information formed in steps S2501 to S2520.

As mentioned above, in the embodiment, for example, by executing the process of step S2501, an example of obtaining means of the information processing apparatus and second obtaining means is realized. For example, by executing the processes of steps S2502 to S2521, an example of the display means is realized.

By executing the flowchart of FIG. 25, by the application selection display screen, the dependent relation between the applications as targets which are installed can be presented to the user in a format of a relationship between parent and child of the tree view with a check list.

Figures 26, 27:
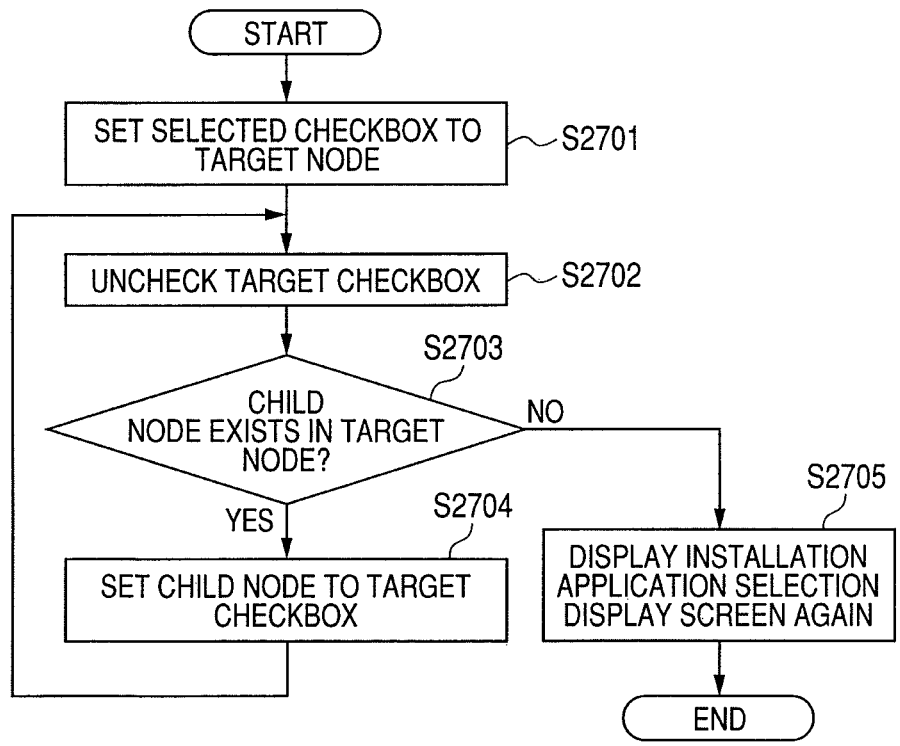
FIG. 26 is diagram illustrating a first example of the installation application selection display screen.
FIG. 27 is flowchart for describing an example of a process in the image forming apparatus in the case where, on the installation application selection display screen, the user unchecked a checkbox of an application which is installed.

FIG. 26 is a diagram illustrating a first example of an installation application selection display screen. It is now assumed that an installation application selection display screen 2600a is displayed under the following conditions. That is, it is assumed that the applications illustrated in FIG. 8 have already been installed in the image forming apparatus 102b. It is also assumed that the apparatuses illustrated in FIG. 18 have already been connected to the image forming apparatus 102b. It is also assumed that the license number LN727 was input by the user in step S401 in FIG. 4.

In FIG. 26, first, a fact that the applications which depend on SEND are an encrypted PDF and a searchable PDF is illustrated as a layered structure by the tree view. A fact that the application which depends on the page description language 1 is the page description language 2 and a fact that the application which depends on the page description language 2 is the page description language 3 are illustrated as a layered structure by the tree view.

Subsequently, an example of a process in the image forming apparatus 102 in the case where, on the installation application selection display screen, the user unchecked a checkbox of an application which is installed will be described with reference to a flowchart of FIG. 27.

In step S2701, the CPU 208 of the image forming apparatus 102 sets the checkbox selected by the user to a target node.

Subsequently, in step S2702, the CPU 208 unchecks the checkbox selected by the user.

Subsequently, in step S2703, the CPU 208 discriminates whether or not the child node exists in the target node. As a result of the discrimination, if the child node does not exist in the target node, step S2705 follows. The CPU 208 allows the installation application selection display screen to be displayed again so that the contents of the process of step S2702 are reflected, and finishes the processes according to the flowchart of FIG. 27.

On the other hand, if the child node exists in the target node, step S2704 follows. The CPU 208 sets the child node as a target node and the processing routine is returned to step S2702.

As mentioned above, in the embodiment, for example, by executing the processes of steps S2701 to S2705, an example of the display means is realized.

By executing the flowchart of FIG. 27, if other applications exist which require the unchecked application to be preliminarily installed, all of those other applications can be unchecked.

Figures 28, 29:
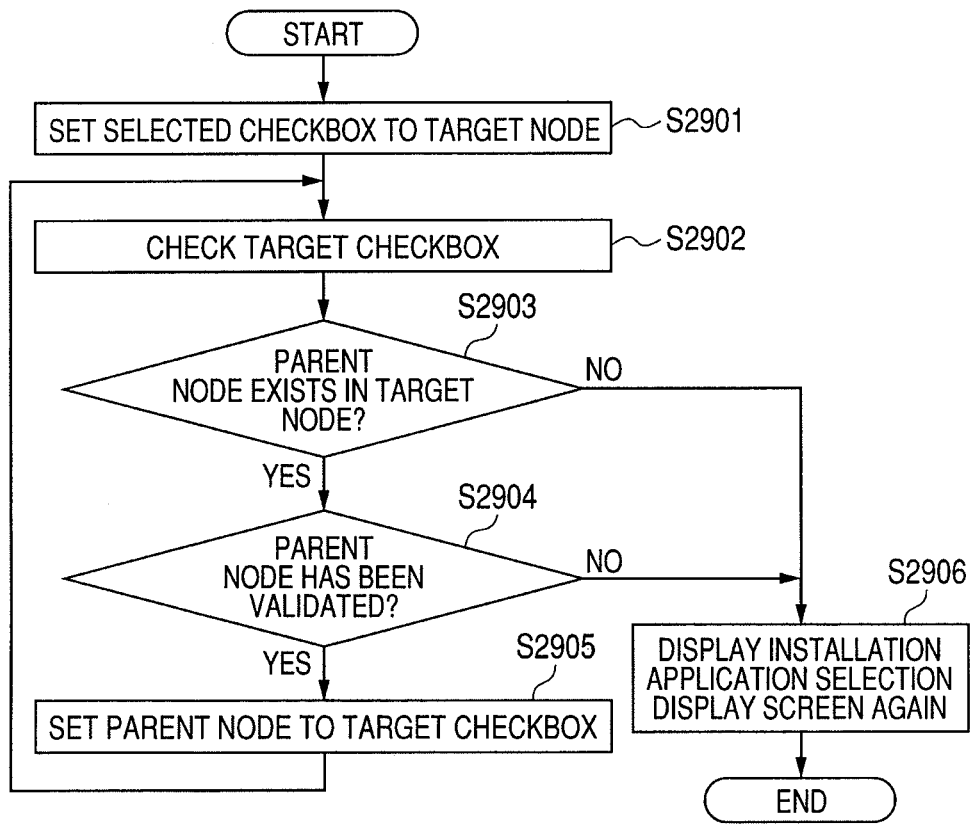
FIG. 28 is diagram illustrating a second example of the installation application selection display screen.
FIG. 29 is flowchart for describing an example of a process in the image forming apparatus in the case where, on the installation application selection display screen, the user checked a checkbox of an application which is installed.

FIG. 28 is a diagram illustrating a second example of the installation application selection display screen. On the installation application selection display screen 2600a, if the checkbox of the page description language 1 is unchecked, the checkboxes of the page description languages 2 and 3 are also unchecked and the display screen is changed to an installation application selection display screen 2600b as illustrated in FIG. 28.

Subsequently, an example of a process in the image forming apparatus 102 in the case where, on the installation application selection display screen, the user checked a checkbox of an application which is installed will be described with reference to a flowchart of FIG. 29.

In step S2901, the CPU 208 of the image forming apparatus 102 sets the checkbox selected by the user to the target node.

Subsequently, in step S2902, the CPU 208 checks the checkbox selected by the user.

Subsequently, in step S2903, the CPU 208 discriminates whether or not a parent node exists in the target node. As a result of the discrimination, if the parent node does not exist in the target node, step S2906 follows. The CPU 208 allows the installation application selection display screen to be displayed again so that the contents of the process of step S2902 are reflected, and finishes the processes according to the flowchart of FIG. 29.

On the other hand, if the parent node exists in the target node, step S2904 follows. The CPU 208 discriminates whether or not a checkbox in the parent node is a validated checkbox. As a result of the discrimination, if the checkbox in the parent node is not the validated checkbox, step S2906 follows. The CPU 208 allows the installation application selection display screen to be displayed again so that the contents of the process of step S2902 are reflected, and finishes the processes according to the flowchart of FIG. 29. On the other hand, if the checkbox in the parent node is the validated checkbox, step S2905 follows. The CPU 208 sets the parent node as a target node and the processing routine is returned to step S2902.

As mentioned above, in the embodiment, for example, by executing the processes of steps S2901 to S2906, an example of the display means is realized.

By executing the flowchart of FIG. 29, if other applications which need to be preliminarily installed before the checked application is installed exist, all of those other applications can be checked.

For example, if the checkbox of the page description language 3 was checked on the installation application selection display screen 2600b illustrated in FIG. 28, the checkboxes of the page description languages 1 and 2 are also checked. That is, the display screen is changed to the installation application selection display screen 2600a as illustrated in FIG. 26.

As mentioned above, in the embodiment, such a tree view display that the application which needs to be preliminarily installed is set to the parent node, and when installing, the application which requires such an application to be installed is set to the child node of the parent node is performed. Therefore, with respect to each application, the application which needs to be preliminarily installed before the application is installed can be visually displayed. Consequently, in the embodiment, without operating the checkbox, the user can know the application which needs to be preliminarily installed before the application corresponding to the checkbox is installed.

In the embodiment, the relation between the application and the application which needs to be preliminarily installed before the application is installed is displayed on one display screen by performing the tree view display. However, if those applications are associatively displayed, it is not always necessary to perform the tree view display. For example, information which specifies the applications in the horizontal direction in order from the application which needs to be installed first may be displayed.

Also in the embodiment, the modification described in the foregoing first embodiment can be applied.

Each of the foregoing embodiments is nothing but an example of the embodiment when carrying out the invention and the technical scope of the invention should not be limitatively interpreted by them. That is, the invention can be embodied in various forms without departing from its technical idea or principal features.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a reading medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-070884, filed Mar. 23, 2009, which is hereby incorporated by reference herein in its entirety.

The invention claimed is:

1. An information distributing apparatus which can communicate with an image forming apparatus, comprising:
   an obtaining unit configured to obtain, from the image forming apparatus, information showing whether or not an external apparatus which can execute a predetermined program in place of the image forming apparatus has been connected to the image forming apparatus; and
   a distributing unit configured to distribute the predetermined program so as to install the predetermined program into the image forming apparatus,
   wherein if it is determined from the information obtained by the obtaining unit that the external apparatus which can execute the predetermined program in place of the image forming apparatus has been connected to the image forming apparatus, the distributing unit is controlled so as not to distribute the predetermined program to the image forming apparatus,
   wherein the obtaining unit further obtains information showing whether or not the image forming apparatus can execute the predetermined program,
   wherein if it is determined from the information obtained by the obtaining unit that the image forming apparatus cannot execute the predetermined program and the external apparatus which can execute the predetermined program in place of the image forming apparatus has been connected to the image forming apparatus, the distributing unit is controlled so as not to distribute the predetermined program to the image forming apparatus, and
   if it is determined from the information obtained by the obtaining unit that the image forming apparatus cannot execute the predetermined program and the external apparatus which can execute the predetermined program in place of the image forming apparatus is not connected to the image forming apparatus, the distributing unit is controlled so as to distribute the predetermined program to the image forming apparatus.

2. The information distributing apparatus according to claim 1, wherein
   in the case where the distributing unit distributes the predetermined program, and the predetermined program has as an installing condition that a second program different from the predetermined program has been installed when the predetermined program is installed into the image forming apparatus, then the distributing unit distributes the predetermined program, the second program, and information which designates an order in which the image forming apparatus installs both of the programs.

3. A method of controlling an information distributing apparatus which can communicate with an image forming apparatus, comprising:
   obtaining, from the image forming apparatus, information showing whether or not an external apparatus which can execute a predetermined program in place of the image forming apparatus has been connected to the image forming apparatus; and
   distributing the predetermined program so as to install the predetermined program into the image forming apparatus,
   wherein if it is determined from the obtained information that the external apparatus which can execute the predetermined program in place of the image forming apparatus has been connected to the image forming apparatus, the distributing is controlled so as not to distribute the predetermined program to the image forming apparatus,
   wherein in the obtaining step, information showing whether or not the image forming apparatus can execute the predetermined program is also obtained,
   wherein if it is determined from the obtained information that the image forming apparatus cannot execute the predetermined program and the external apparatus which can execute the predetermined program in place of the image forming apparatus has been connected to the image forming apparatus, the distributing is controlled so as not to distribute the predetermined program to the image forming apparatus, and
   wherein if it is determined from the obtained information that the image forming apparatus cannot execute the predetermined program and the external apparatus which can execute the predetermined program in place of the image forming apparatus is not connected to the image forming apparatus, the distributing is controlled so as to distribute the predetermined program to the image forming apparatus.

4. The method according to claim 3, wherein
   in the case where the predetermined program is distributed in the distributing and the predetermined program has as an installing condition that a second program different from the predetermined program has been installed when the predetermined program is installed into the image forming apparatus, then in the distributing, the predetermined program, the second program, and information which designates an order in which the image forming apparatus installs both of the programs are distributed.

5. A non-transitory computer-readable storage medium storing a program for allowing a computer to execute a method of controlling an information distributing apparatus which can communicate with an image forming apparatus, the method comprising:

obtaining, from the image forming apparatus, information showing whether or not an external apparatus which can execute a predetermined program in place of the image forming apparatus has been connected to the image forming apparatus; and distributing the predetermined program so as to install the predetermined program into the image forming apparatus, wherein if it is determined from the obtained information that the external apparatus which can execute the predetermined program in place of the image forming apparatus has been connected to the image forming apparatus, the distributing is controlled so as not to distribute the predetermined program to the image forming apparatus, wherein in the obtaining, information showing whether or not the image forming apparatus can execute the predetermined program can be also further obtained, if it is determined from the obtained information that the image forming apparatus cannot execute the predetermined program and the external apparatus which can execute the predetermined program in place of the image forming apparatus has been connected to the image forming apparatus, the distributing is controlled so as not to distribute the predetermined program to the image forming apparatus, and if it is determined from the obtained information that the image forming apparatus cannot execute the predetermined program and the external apparatus which can execute the predetermined program in place of the image forming apparatus is not connected to the image forming apparatus, the distributing is controlled so as to distribute the predetermined program to the image forming apparatus.

6. The non-transitory computer-readable storage medium according to claim 5, wherein in the case where the predetermined program is distributed in the distributing and the predetermined program has as an installing condition that a second program different from the predetermined program has been installed when the predetermined program is installed into the image forming apparatus, then in the distributing, the predetermined program, the second program, and information which designates an order in which the image forming apparatus installs both of the programs are distributed.

7. An information distributing apparatus which can communicate with an image forming apparatus, comprising:

an obtaining unit configured to obtain state information of the image forming apparatus from the image forming apparatus;

a discriminating unit configured to discriminate, for each of a plurality of programs whose distribution is requested from the image forming apparatus, whether it is necessary to distribute the respective program to the image forming apparatus or not based on the state information obtained by the obtaining unit; and a distributing unit configured in such a manner that, among the plurality of programs whose distribution is requested from the image forming apparatus, each program for which it is determined by the discriminating unit that there is no need to distribute is not distributed to the image forming apparatus and each program for which it is determined by the discriminating unit that it is necessary to distribute is distributed to the image forming apparatus, wherein the state information obtained by the obtaining unit includes information showing, for each of the plurality of programs whose distribution is requested from the image forming apparatus, whether or not an external apparatus which can execute the respective program in place of the image forming apparatus has been connected to the image forming apparatus, and information showing whether or not the image forming apparatus can execute the respective program, wherein if it is determined from the obtained state information that the image forming apparatus cannot execute the respective program and the external apparatus which can execute the respective program in place of the image forming apparatus has been connected to the image forming apparatus, the discriminating unit determines that it is not necessary to distribute the respective program to the image forming apparatus, and wherein if it is determined from the obtained state information that the image forming apparatus cannot execute the respective program and the external apparatus which can execute the respective program in place of the image forming apparatus is not connected to the image forming apparatus, the discriminating unit determines that it is necessary to distribute the respective program to the image forming apparatus.

8. The information distributing apparatus according to claim 7, wherein the plurality of programs are a group of programs designated based on identification information transmitted from the image forming apparatus.

\* \* \* \* \*